United States Patent [19]
Miller et al.

[11] Patent Number: 6,016,475
[45] Date of Patent: *Jan. 18, 2000

[54] SYSTEM, METHOD, AND ARTICLE OF MANUFACTURE FOR GENERATING IMPLICIT RATINGS BASED ON RECEIVER OPERATING CURVES

[75] Inventors: Bradley N. Miller, Plymouth; Joseph A. Konstan, St. Paul; John T. Riedl, Falcon Heights, all of Minn.

[73] Assignee: The Regents of the University of Minnesota, Minneapolis, Minn.

[ * ] Notice: This patent is subject to a terminal disclaimer.

[21] Appl. No.: 08/729,787

[22] Filed: Oct. 8, 1996

[51] Int. Cl.⁷ ..................................................... G06F 17/30
[52] U.S. Cl. .......................................... 705/1; 705/7; 707/2
[58] Field of Search .......................... 705/1, 7, 11; 707/3, 707/5, 2

[56] References Cited

U.S. PATENT DOCUMENTS

| | | |
|---|---|---|
| 3,952,184 | 4/1976 | Bassard . |
| 4,041,617 | 8/1977 | Hollander . |
| 4,205,464 | 6/1980 | Baggott . |
| 4,331,973 | 5/1982 | Eskin et al. . |
| 4,348,740 | 9/1982 | White . |
| 4,546,382 | 10/1985 | McKenna et al. . |
| 4,566,030 | 1/1986 | Nickerson et al. . |
| 4,602,279 | 7/1986 | Freeman . |
| 4,627,818 | 12/1986 | Von Fellenberg . |
| 4,630,108 | 12/1986 | Gomersall . |
| 4,646,145 | 2/1987 | Percy et al. . |
| 4,647,964 | 3/1987 | Weinblatt . |
| 4,658,290 | 4/1987 | McKenna et al. . |
| 4,682,956 | 7/1987 | Krane . |
| 4,745,549 | 5/1988 | Hashimoto . |
| 4,781,596 | 11/1988 | Weinblatt . |
| 4,870,579 | 9/1989 | Hey . |
| 4,872,113 | 10/1989 | Dinerstein . |
| 4,930,077 | 5/1990 | Fan . |
| 4,996,642 | 2/1991 | Hey . |
| 5,386,104 | 1/1995 | Sime . |
| 5,410,344 | 4/1995 | Graves et al. . |
| 5,544,281 | 8/1996 | Maruoka et al. . |
| 5,704,017 | 12/1997 | Heckerman et al. . |
| 5,708,591 | 1/1998 | Givens et al. . |
| 5,754,938 | 5/1998 | Herz et al. . |
| 5,754,939 | 5/1998 | Herz et al. . |

FOREIGN PATENT DOCUMENTS 2 461 302   1/1981   France .

OTHER PUBLICATIONS

Belkin, N. et al., "Information filtering and information retrieval: Two sides of the same coin?" *Communications of the ACM,* 35(12), 16 pgs. (Dec. 1992).

Foltz, P. et al., "Personalized information delivery: an analysis of information filtering methods," *Communications of the ACM,* 35(12), 15 pgs. (Dec. 1992).

Loeb, S., "Architecting personalized delivery of multimedia information," *Communications of the ACM,* 35(12), 15 pgs. (Dec. 1992).

Swets, "Measuring the Accuracy of Diagnostic Systems" Science, v. 240, No. 4857, p. 1285(9), Jun. 3, 1988.

(List continued on next page.)

*Primary Examiner*—Melanie A. Kemper
*Attorney, Agent, or Firm*—Merchant & Gould P.C.

[57] ABSTRACT

An electronic rating broker is provided. The rating broker includes an input mechanism for obtaining an implicit measure concerning items presented to a user. A processor is operatively coupled to the input mechanism and an output device to cooperatively perform several functions. These functions include generating an implicit rating as a function of the implicit measure using a receiver operating curve (ROC). The output device is provided the implicit rating by the processor. In addition, a method is provided for operating an electronic rating broker on a computer system in order to provide an implicit rating generated with an ROC. Also, a storage device readable by a computer system for implementing this method is provided.

34 Claims, 12 Drawing Sheets

OTHER PUBLICATIONS

V. Mashayekhi et al., "CAIS: Collaborative Asynchronous Inspection of Software," Department of Computer Science, University of Minnesota, Oct. 25, 1994.

P. Resnick et al., "GroupLens: An Open Architecture for Collaborative Filtering of Netnews," Department of Computer Science, University of Minnesota and MIT Center for Coordination Science, Jan. 19, 1995.

D. Goldberg et al., "Using Collaborative Filtering to Weave an Information Tapestry," *Communications of the ACM,* vol. 35, No. 12, Dec. 1992.

U. Shardanand et al., "Social Information Filtering: Algorithms for Automating 'Word of Mouth'," CHI '95 Mosaic of Creativity, May 7–11, 1995.

M. Morita et al., "Information Filtering Based on User Behavior Analysis and Best Match Text Retrieval," School of Information Science, Japan Advanced Institute of Science and Technology.

G. Salton, "The State of Retrieval System Evaluation," vol. 28, No. 4, (1992) pp. 441–449.

T. Saracevic, Ph D., "Evaluation of Evaluation in Information Retrieval," School of Communication, Information and Library Studies, Rutgers University, pp. 138–146.

T. B. Roby, "Belief States: A Preliminary Empirical Study," *Technical Documentary Report No. ESD–TDR–64–238,* Mar. 1964.

References, Publications of the U. S. Army Personnel Research Office, OCRD, DA, p. 5.

C. S. Gersoni et al., Technical Research Note 143, "Values Associated with Military Caseer Motivation".

L. V. Gordon et al., Technical Research Note 143, "Values Associated with Military Caseer Motivation".

L. J. Stricker, "Difficulty and Other Correlates of Criticalness Response Style at the Item Level," Educational Testing Service, May 1961.

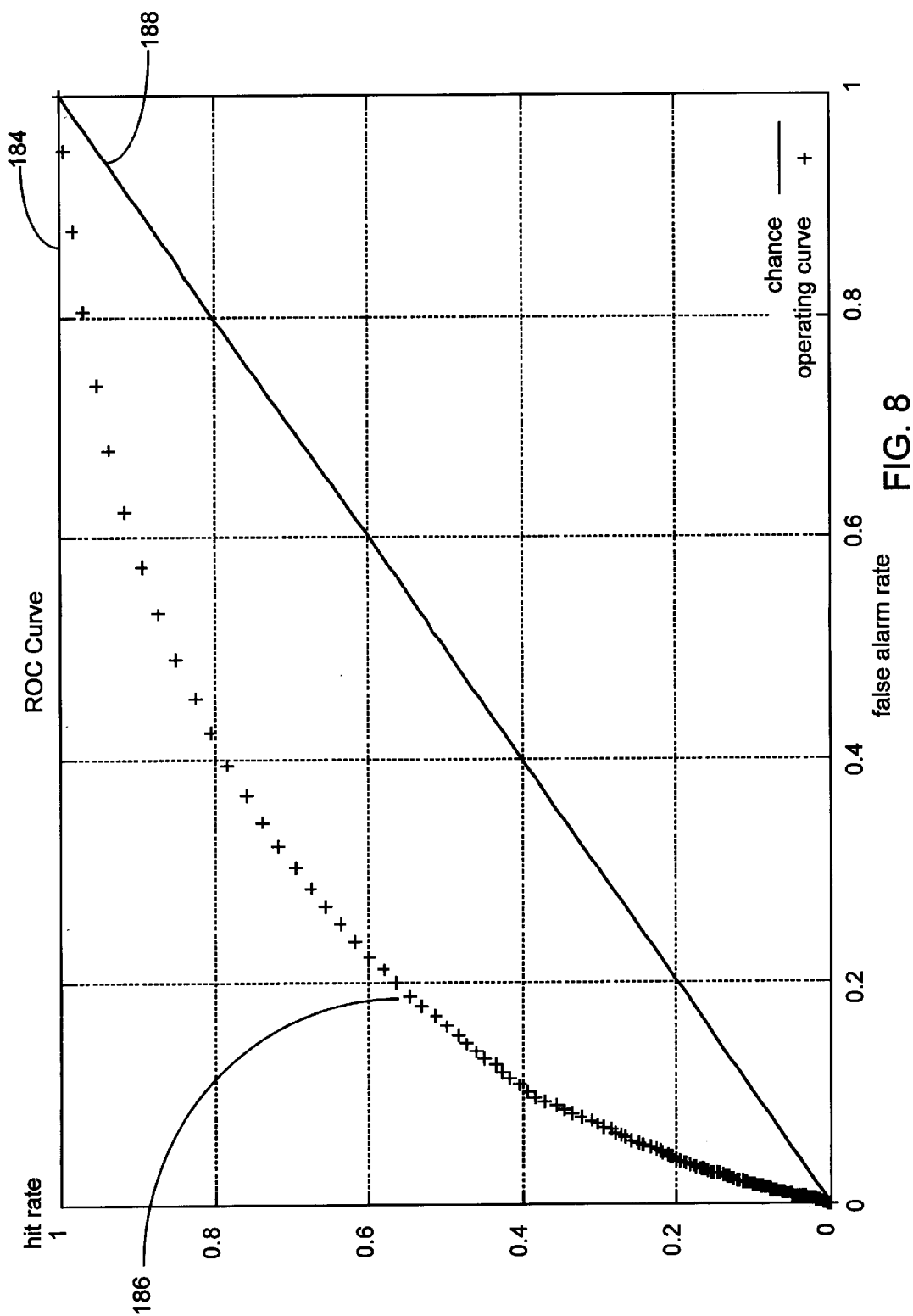

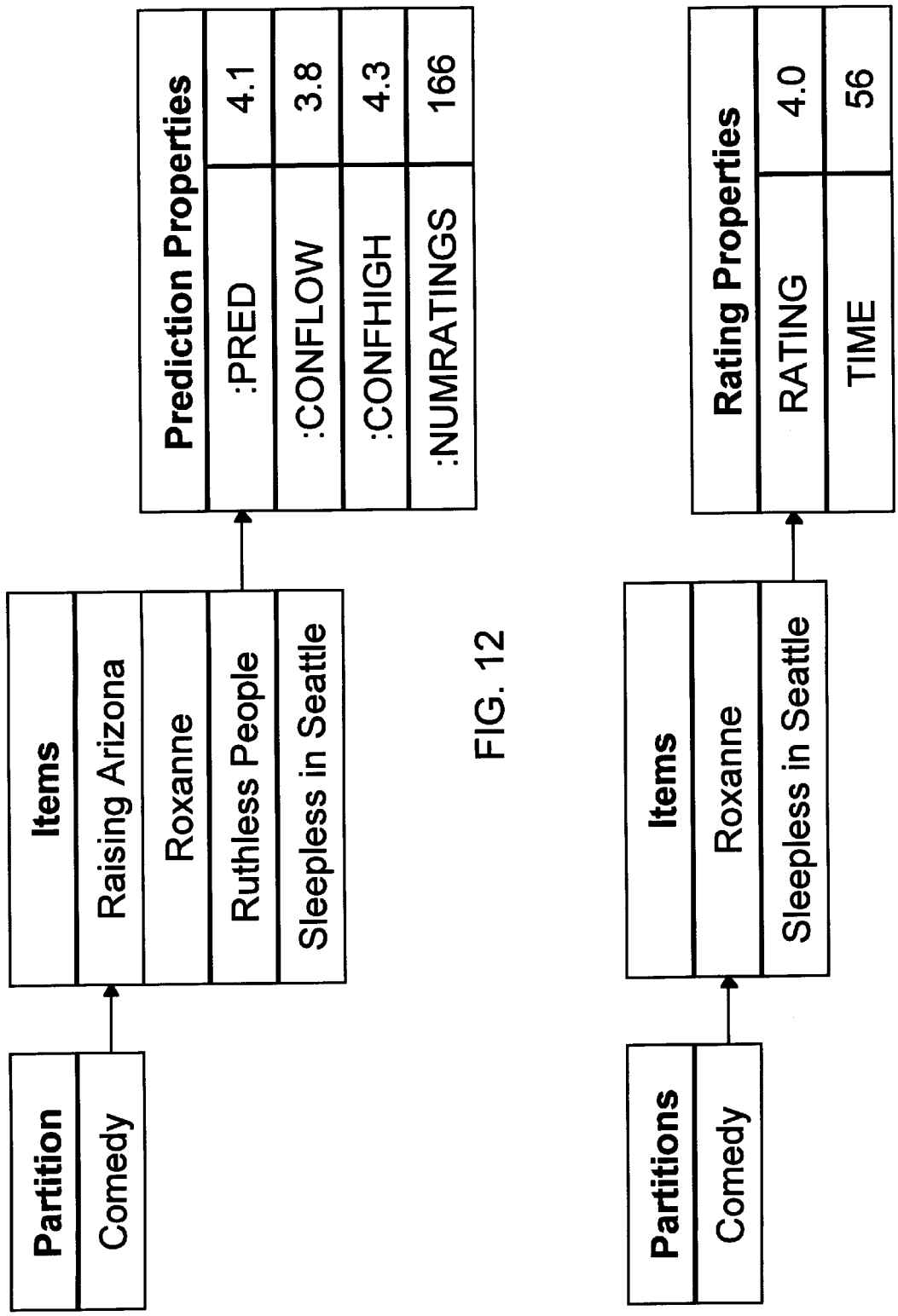

SYSTEM, METHOD, AND ARTICLE OF MANUFACTURE FOR GENERATING IMPLICIT RATINGS BASED ON RECEIVER OPERATING CURVES

FIELD OF THE INVENTION

The present invention relates generally to systems that use implicit measures of user interest in items to create implicit ratings for the users. More specifically, the present invention is directed to the use of receiver operating curves (ROCs) to convert implicit measures of user interest into implicit ratings for those users. Subsequently, the implicit ratings are output to other systems that use the ratings as an indication of user interest in the items.

BACKGROUND OF THE INVENTION

Centuries ago the critical information problems were how to record information and how to distribute information. Today, the computer has nearly completely solved these problems. Most information is now recorded directly on computer media and as a result thousands of pages of information are moved around the world in seconds via electronic data networks. In the process of solving information dissemination problems, however, people have overwhelmed themselves with the sheer volume of available information. The critical question is how to benefit from the richness of the available information without getting bogged down by the overwhelming volume.

One possibility is to make use of the opinions each person forms when perusing any piece of information. Taken together, the web of all of these opinions is a rich resource that could be used to sift through the available information for nuggets of value. This technique is already applied informally, through word-of-mouth in the physical world, and through forwarded mail, news, and uniform resource locators (URLS) in the virtual world. However, these informal processes are not powerful enough to deal with the millions of new documents being created every week. Computers helped create this problem; perhaps they can help solve it. A need exists for a solution that gathers this collective wisdom more formally, and applies it to the problem of selecting which of the available documents will be valuable to each person, individually.

These principles have been applied in one area of research, known as collaborative filtering. Collaborative filtering seeks to understand the relationships between people, and to use those relationships to help people meet information their needs more effectively. Ratings are entered by the user to indicate his or her opinion of the document to the collaborative filtering system. Based on previously entered ratings by other users, predictions are made for a user of the value of an item to that user. Ratings often represent the user's evaluation of the document along one or more dimensions. There are many possible dimensions, including overall enjoyment, value to the task at hand, interest in the topic, reputation of the author, appropriateness for the context, quality of writing, and amount of new material versus repeated material. Ratings along each of these dimensions can be either explicit, requiring special user interaction, or implicit, captured from ordinary user actions.

The most common explicit rating methods in collaborative filtering systems are single keystrokes entered by users. The keystrokes usually represent values along a single ordered dimension, discretized for ease-of-entry. Ratings can also be entered through graphical sliders, which are similar, except that they often support more possible values. Another common rating method is textual ratings. Textual ratings are either keyword or free-form. Keyword textual ratings often focus on characterizing the topic. Keyword textual ratings that focus on measuring the quality are very similar to keystroke ratings. Free-form textual ratings can be valuable for users, but are difficult to process automatically. Free-form textual ratings are more common in domains in which the total number of documents is relatively low, so users can peruse a substantial fraction of them.

Implicit ratings are collected by non-intrusively watching the user read a document. Observations about what the user does with the document may lead to insights into the value of the document to the user. For instance, if a user reads the title or abstract of a document, but chooses not to read the document, that may indicate low interest in the topic of the document. On the other hand, if the user chooses to save a document to a file, or to forward it to a colleague, that may indicate higher interest in the document. The time that a user spends reading a document (time spent reading) is another implicit rating. Intuitively, users are likely to spend longer with documents they find valuable than with documents they find uninteresting.

Collaborative filtering systems have largely focused on explicit ratings. In small tightly focused groups with substantial shared interests, textual ratings have proven valuable. However, in larger groups with more diverse interests, automatic computation of personalized predictions would benefit from a more structured ratings system.

In a system using explicit ratings, the user answers each question with a keystroke or other indication of preference. The system uses the user's answer to this question to influence its prediction algorithms for this user in the future. Users can informally combine their ratings along any of the possible ratings dimensions to create this single rating. Existing prediction algorithms do a good job of making predictions for users based on explicit ratings along this single dimension.

Although explicit ratings have worked well in practice, there are some significant advantages to implicit ratings. Most importantly, an implicit rating requires no effort on the part of the user, making the collaborative filtering system zero cost to users. This overcomes the problem of user resistance to using a collaborative filtering system. One source of this resistance is the fact that the collaborative filtering system returns little or no value to a user until the user has rated dozens of documents, thus generating enough information for the correlation algorithm to create a correlation group. Another source of resistance is that the rating of documents can be difficult for users to learn how to do. The two sources for this difficulty are learning the interface, and learning to create mental ratings judgments while reading documents.

In contrast, implicit ratings would incur no cost for the user to try the system, and would have no learning curve for either the interface or for creating the ratings. These advantages may mean that implicit ratings would lead to more users, which in turn would lead to more effective correlations and predictions, potentially creating a positive feedback loop. Another advantage is that since implicit ratings do not require any interaction from users, and are fast enough to be transparent to users, they do not induce any hidden effects in how users read documents. For instance, the act of creating an explicit rating might change a user's reading style, changing the total value they receive from the system. On the other hand, an implicit rating is unlikely to change a user's reading style because the user does not do anything different to produce the rating. However, if predictions generated from implicit ratings are presented to the user they may change their reading style.

Therefore, implicit ratings will be valuable if they can be effectively generated from implicit measurements of user behavior. One of the problems of using implicit measurements is finding a way to convert these measures into ratings in a way that leads to effective predictions.

The present invention provides a solution to this and other problems, and offers other advantages over the prior art.

SUMMARY OF THE INVENTION

The present invention relates to using a receiver operating curve (ROC) to generate implicit ratings in an electronic rating broker.

In accordance with one embodiment of the invention, the rating broker includes an input mechanism for obtaining an implicit measure concerning items presented to a user. A processor is operatively coupled to the input mechanism and an output device to cooperatively perform several functions. These functions include generating an implicit rating as a function of the implicit measure using a receiver operating curve (ROC). The output device is provided the implicit rating by the processor.

In accordance with another embodiment of the present invention, a prediction information system includes the rating broker as well as a client device operatively coupled to the rating broker through an interactive network. The client device includes a user interface which presents the items and the prediction results to the user. In addition, the client device includes a user input device which receives data input by the user. A client processor is operatively coupled to the user interface and user input device to cooperatively perform several functions. These client processor-based functions include: obtaining the implicit measure, providing the implicit measure to the input mechanism of the rating broker, receiving the prediction results from the output device of the rating broker, and presenting the prediction results to the user on the user interface.

In addition, the present invention also consists of a method for operating an electronic rating broker in order to provide an implicit rating generated with an ROC. Also, the present invention can be implemented as a computer-readable program storage device which tangibly embodies a program of instructions executable by a computer system to operate an electronic rating broker on a computer system in order to provide an implicit rating generated with an ROC.

These and various other features as well as advantages which characterize the present invention will be apparent upon reading of the following detailed description and review of the associated drawings.

BRIEF DESCRIPTION OF THE DRAWINGS

FIG. 8 shows a graph containing a receiver operating curve (ROC) mapped from the histogram shown in FIG. 7.

FIG. 12 shows a graph of two ROCs, one for users who had not seen predictions before entering a rating, and one for users who had seen predictions before entering a ratings.

FIG. 13 shows a graph of three ROCs used to compare three prediction systems.

DETAILED DESCRIPTION

Figure 1:
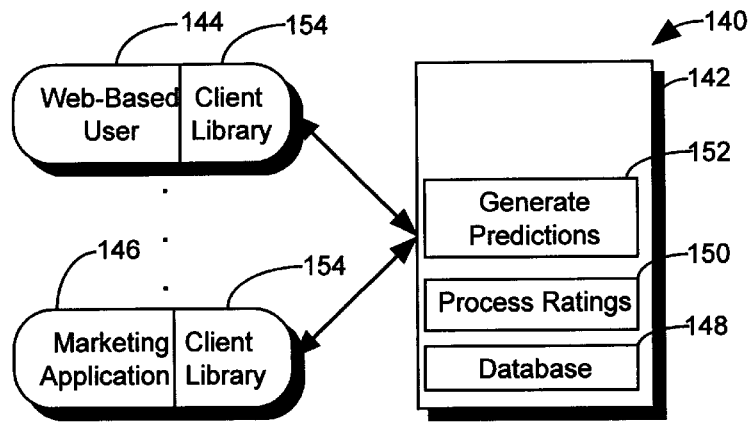
FIG. 1 is a block diagram of a high level overview of a preferred embodiment prediction information system client-server architecture in accordance with the present invention.

The prediction information system 140 preferably uses a client-server architecture FIG. 1. Collaborative filtering applications, such as those which can be developed with this system, communicate ratings and predictions with the prediction information system server 142. The server 142 receives ratings from the clients 144 through 146, stores them in its databases 148, analyzes them 150, and sends predictions 152 to the clients 144, 146.

Collaborative filtering applications access the prediction information system server 142 through the client library 154. The client library 154 handles the details of connecting to the server 142 through an open network protocol. This protocol preferably is Transmission Control Protocol/Internet Protocol (TCP/IP)-based. The application program 144, 146 is linked with the client library 154. Simple application-program interface (API) calls are used to send ratings to the server 142 and receive predictions from the server 142. Both the send and receive operations are transparently buffered in the client library 154 to achieve high performance while maintaining a simple interface for client programs 144, 146.

The prediction information system server 142 architecture itself preferably is flexible, but provides a uniform interface to clients 144, 146. See for example a sample user interface shown in FIG. 2. The prediction information system server 142 is the generic name for the set of processes that provide prediction information system services to client programs 144, 146.

Figure 3:
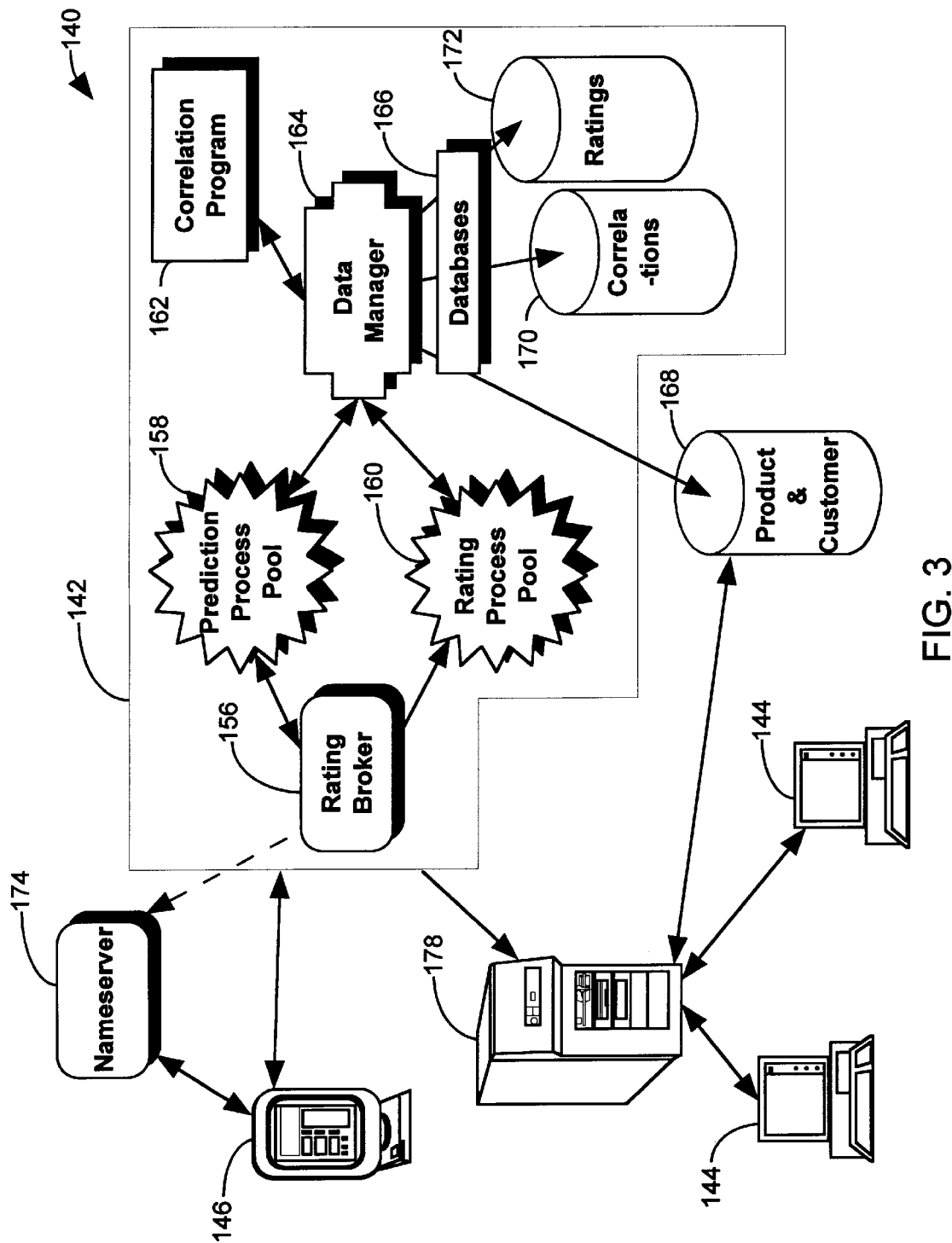
FIG. 3 is a block diagram of a middle level overview of the preferred embodiment prediction information system client-server architecture shown in FIG. 1.

As shown in FIG. 3, the server 142 preferably includes a rating broker 156, prediction processes 158, rating processes 160, a correlation program 162, and a data manager 164. Various types of prediction, ratings, and, correlation programs, or different database back-ends can be used without departing from the scope and spirit of the present invention. The prediction information system rating broker 156 is the part of the server 142 that routes client requests to the appropriate prediction 158 or rating 160 process. Client applications 144, 146 connect to the prediction information system 140 rating broker 156 through the client library 154. Applications are insulated from implementation changes to the server 142 by the consistent API interface.

Figure 4:
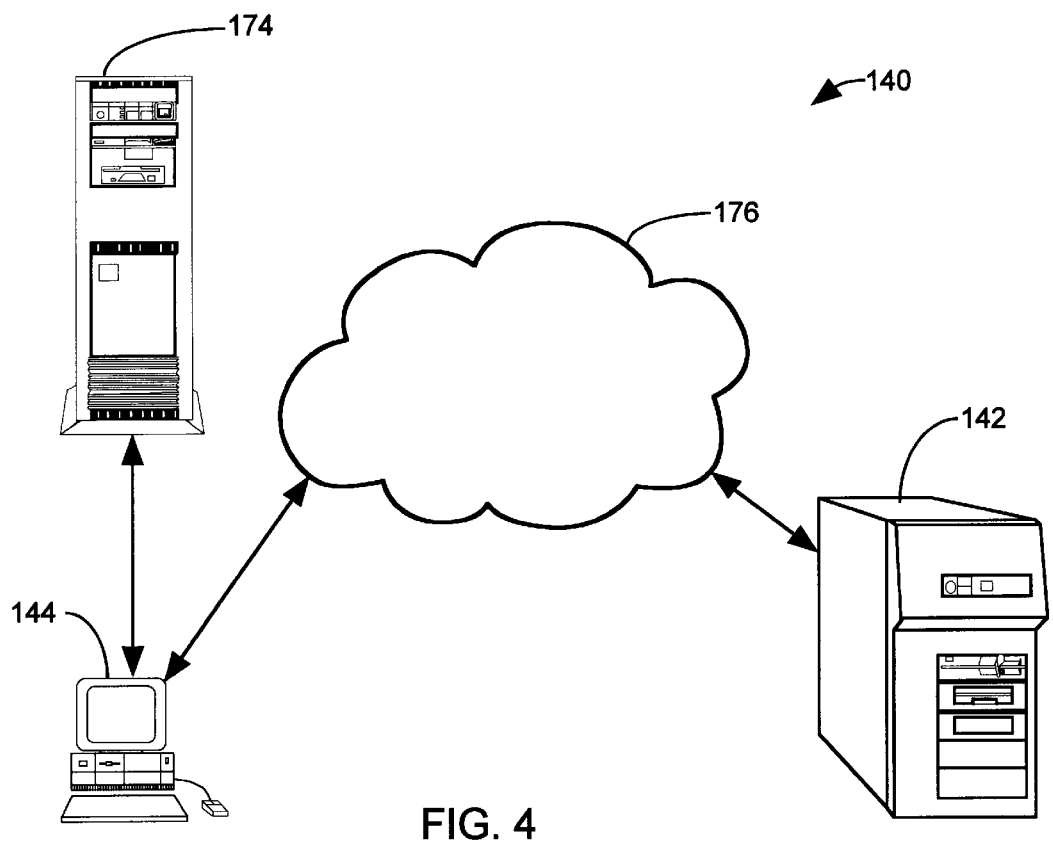
FIG. 4 is a block diagram of a particular arrangement of devices operating as the prediction information system shown in FIG. 1.

FIG. 4 shows one possible approach to building a prediction information system 140 in a collaborative filtering environment. In this environment, client programs executed on computers 144 display items and predictions to users utilizing the clients and send explicit ratings and implicit measures to servers 142 via an interactive network 176. The collaborative filtering servers 142 receive ratings and implicit measures from the clients 144 via the interactive network 176. Also, clients 144 receive items from separate servers 174. The interactive communication network 176 can take many forms. For example, the network 176 may be a data bus, a public switched telephone network (PSTN), a public data network, a private data network, a wireless data service or any combination thereof.

Figure 5:
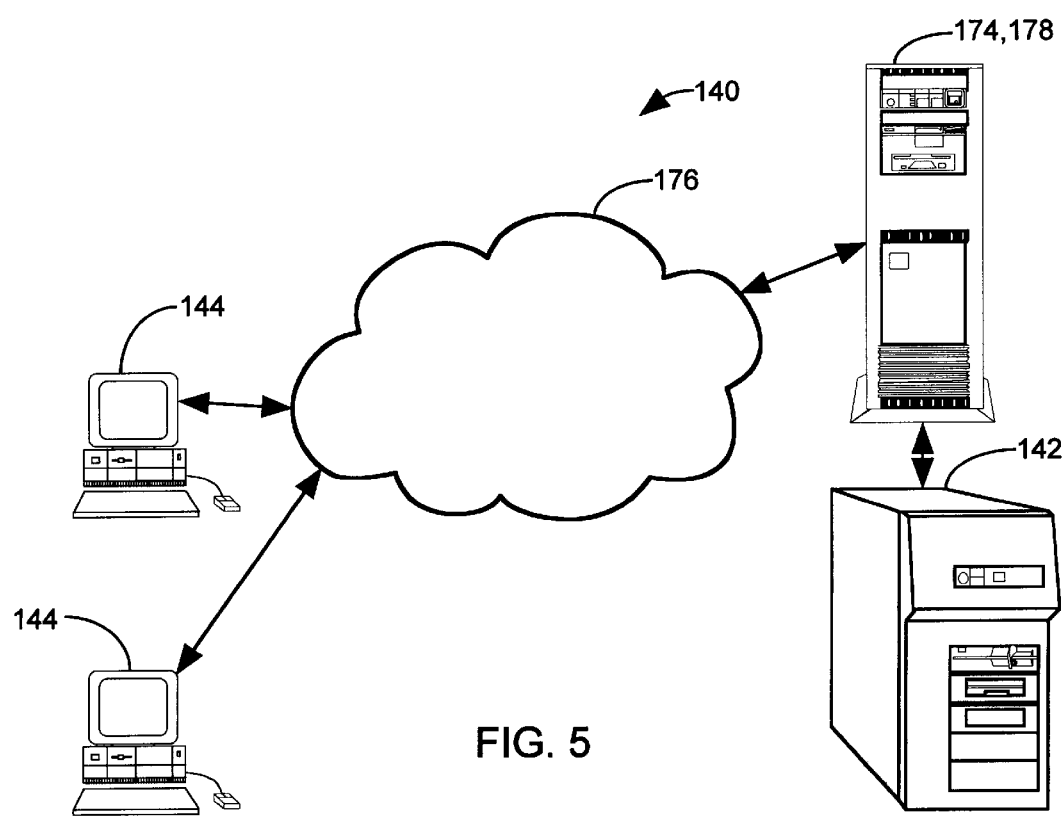
FIG. 5 is a block diagram of an alternative arrangement of devices operating as the prediction information system shown in FIG. 1.

An alternative architecture for collaborative filtering is shown in FIG. 5. Client computers 144 receive partially or completely formatted displays from servers 174, with predictions merged with items. Item servers 174, such as World-Wide Web (WWW) servers 178 directly communicate with collaborative filtering servers 142 to send explicit ratings and implicit measures from clients 144, and to receive predictions.

It will be appreciated by those skilled in the art that the principles described herein could readily be applied to other types of environments besides collaborative filtering without departing from the scope and spirit of the present invention. For example, data mining systems and information retrieval systems may benefit from the teachings of the present invention.

Figure 6:
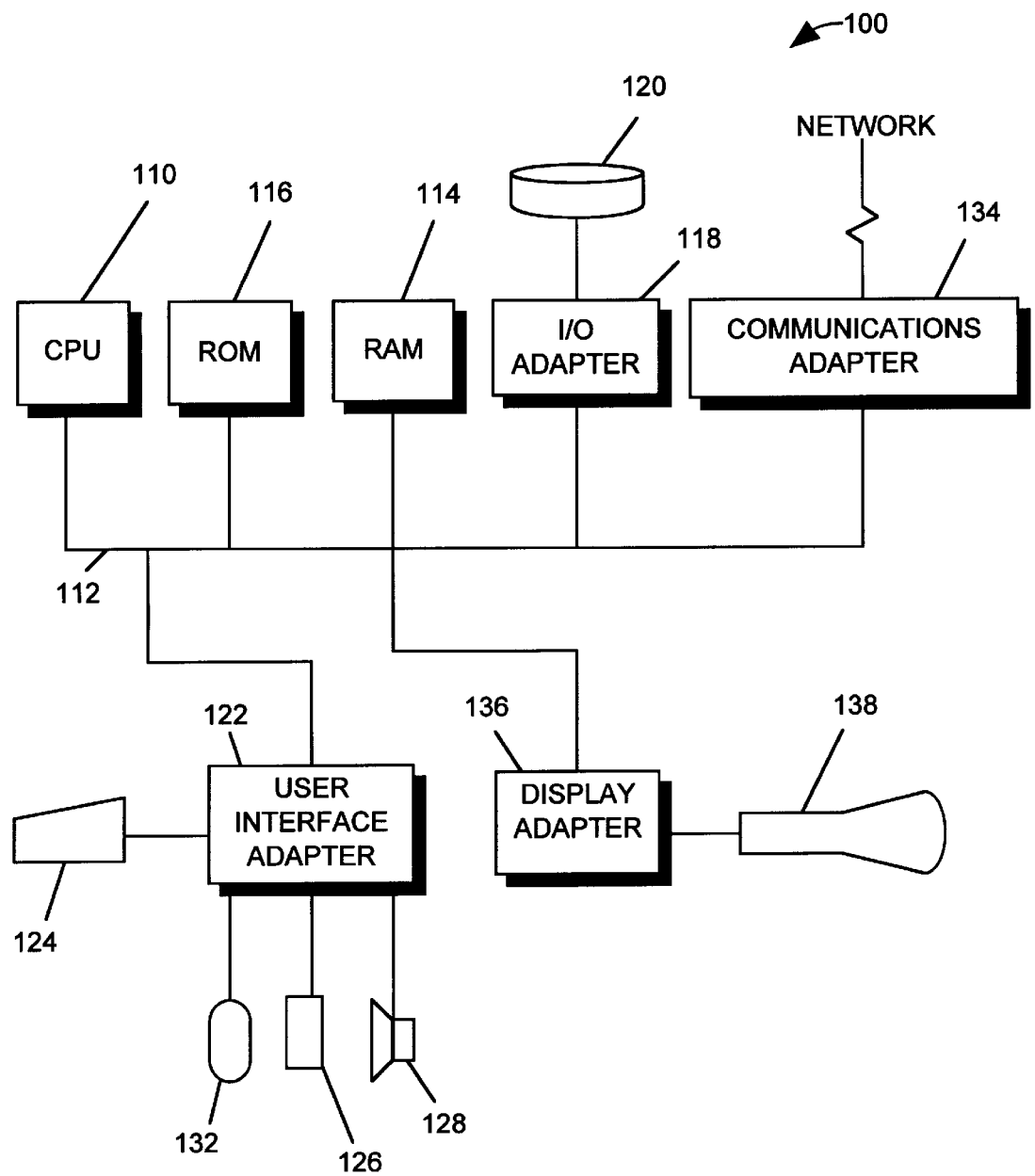
FIG. 6 is a block diagram of a representative hardware implementation which could perform functions of the prediction information system shown in FIG. 1.

Referring now to FIG. 6, the preferred embodiment of the present invention is preferably practiced in the context of an operating system resident on one or more workstations or personal computers such as the Sun Microsystems® Sparc Station®, IBM® PS/2® or Apple® Macintosh® computer. The prediction system clients and or servers may each operate on one or more of these workstations. A representative hardware environment 100 is depicted in FIG. 6, which illustrates a typical hardware configuration of a workstation in accordance with the preferred embodiment having a central processing unit 110, such as a microprocessor, and a number of other units interconnected via a system bus 112. The workstation shown in FIG. 6 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., an interactive network) and a display adapter 136 for connecting the bus 112 to a display device 138. The workstation typically has resident thereon an operating system such as UNIX®, the Microsoft® Windows or Windows NT operating system, the IBM OS/2® operating system or the Apple MacOS® operating system.

Referring now to FIGS. 3 and 6 together, the electronic rating broker 156 operates in a hardware apparatus 100 which has an input mechanism (e.g., i/o adapter 118, communication adapter 134, or user interface adapter 122) for obtaining an implicit measure concerning items presented to a user. A processor 110 is operatively coupled to the input mechanism and an output device (e.g., i/o adapter 118, communication adapter 134, display adapter 136, or user interface adapter 122) to cooperatively perform several functions. These functions include generating an implicit rating as a function of the implicit measure using a receiver operating curve (ROC). The output device is provided the implicit rating by the processor 110.

In one embodiment, the rating broker 156 processor 110 also includes a prediction mechanism 158 which deriving prediction results based on the implicit rating. In such an embodiment, the processor 110 also provides the prediction results to the output device. In addition, this prediction mechanism 158 may derive the prediction results based on both the implicit rating and at least one rating from another user.

In accordance with another embodiment of the present invention, the prediction information system 140 includes the rating broker 156 as well as a client device 144 operatively coupled to the rating broker 156 through an interactive network. The client device 144, like the rating broker 156, operates in a hardware apparatus 100. The client device 144 includes a user interface (e.g., i/o adapter 118, communication adapter 134, display adapter 136, or user interface adapter 122) which presents the items and the prediction results to the user. In addition, the client device includes a user input device (e.g., i/o adapter 118, communication adapter 134, or user interface adapter 122) which receives data input by the user. A client processor 110 is operatively coupled to the user interface and user input device to cooperatively perform several functions. These client processor-based functions include: obtaining the implicit measure, providing the implicit measure to the input mechanism of the rating broker, receiving the prediction results from the output device of the rating broker, and presenting the prediction results to the user on the user interface.

In accordance with another embodiment, the prediction information system 140 may have a client processor 144 and a rating broker 156 located within a single apparatus 100. In this embodiment, the system 140 may be set up as a kiosk in a store that customers query for a recommendation on a movie, book, music, or other choices.

In accordance with another embodiment as shown in FIGS. 4 and 5, the client processor 144 communicates with the rating broker 156 operating on a server 142 through an interactive network 176 such that they are remotely located from one another. In such an arrangement, the user interface, input mechanism, and processor together form a client computing device which is operatively coupled through the interactive network 176 to a server 142 which executes a process that performs functions of the rating broker 156. In some instances it may be beneficial to split the processing tasks between a first processor and a second processor which together perform the operations of the client processor 144. If this splitting of processing of tasks is done, then the user interface, input mechanism, and first processor together may form a client computing device which is operatively coupled through the interactive network 176 to a server 142 which houses the second processor and which executes a process that performs functions of the rating broker 156.

One application for the prediction information system 140 is reading Usenet news. A typical news-reading session for a prediction information system 140 enhanced newsgroup works as follows. The user starts up a news-reader on a computing device 144, which creates a connection to both the news server 174 and the other server 142 which operates as the rating broker 156. The newsreader authenticates itself to the rating broker 156 by using a pseudonym chosen, and registered with the rating broker 156 through, for example, a World Wide Web site. The rating broker 156 makes no association between a user's pseudonym, and his real identity.

Figure 2:
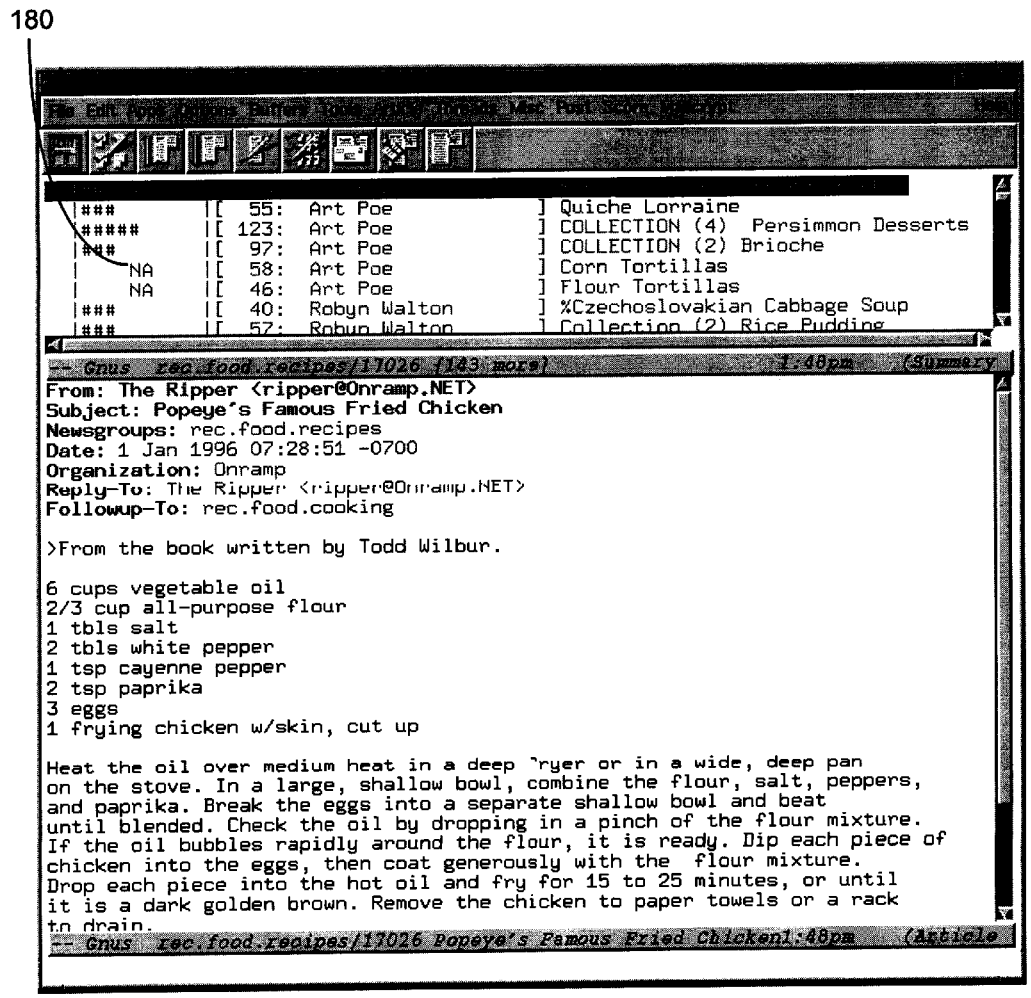
FIG. 2 shows a sample user interface which can be used in the prediction information system shown in FIG. 1.

The user selects a newsgroup to read, and "enters" the newsgroup. The newsreader contacts the news server 174 and obtains header information for items the user has not read yet. The newsreader contacts the rating broker 156 and requests predictions for the unread items. The rating broker 156 calculates personalized predictions for the user and returns the predictions to the newsreader. FIG. 2 illustrates what the predictions look like to the user on a user interface used by the newsreader. Newsreaders such as the UNIX®-based GNUS, tin, or xrn could be used. Once the user has the predictions he can pick and choose which items he wants to read based on the subject lines and the predictive scores supplied for each item. In FIG. 2, a prediction of NA 180 indicates that the rating broker 156 could not calculate a prediction for the item. When the user selects an item to read the newsreaders sets a timer to keep track of how much time the user spends reading the article as an implicit measure. After the user has read some or all of the article he gives the article a rating on a scale from 1 to 5. To make rating articles as easy as possible, the interface is designed so that a rating can be entered with a single extra keystroke. Users can rate articles in answer to questions like the following sample question: "Would I like to see more articles like this one?" In answer to this question, a 1 indicates a strong no and a 5 indicates a strong yes.

Once the user has read and rated the articles he is interested in he "leaves" the newsgroup. When a user leaves a newsgroup the newsreader sends all the ratings and times collected for the read articles to the rating broker 156. The prediction information system 142 stores the ratings, time measurements, and predictions in a database for analysis.

Arbitrarily Mapping Implicit Measures To Rating

The first problem is how to turn an implicit measure into a rating that is useful. One way to make the conversion is to arbitrarily map blocks of time into ratings. For example 0–16 seconds maps to a rating of 1, 17–27 seconds maps to a rating of 2, etc. In Table 1 a mapping of times to ratings is shown. This mapping was created by taking the average of the time spent reading for each item rated with each rating.

TABLE 1

| Time Spent Reading | Rating |
| --- | --- |
| 0–16 | 1 |
| 17–27 | 2 |
| 28–38 | 3 |
| 39–56 | 4 |
| 57– | 5 |

Applying Rocs Directly

A better mechanism for converting time spent reading (TSR) to a rating is to apply signal detection theory to determine the best threshold. Signal detection theory is a mathematical theory that models the process of detecting signals in noise. Signal detection theory decisions are based on the value of a decision variable which varies for both signal and noise. If the value of the decision variable is greater than some threshold for an item then that item is classified as a signal. If the value of the decision variable is less than the threshold for an item, then the item is classified as noise.

In this case, the decision variable is defined to be TSR. If the value of TSR for an article is greater than some threshold, then the article will be classified as a signal, and it will be given a high rating. If the TSR for an article is less than the threshold, then it will be classified as noise. A software development toolkit can be provided with the tools needed to set an appropriate threshold or an operating point for the decision variable.

Figure 7:
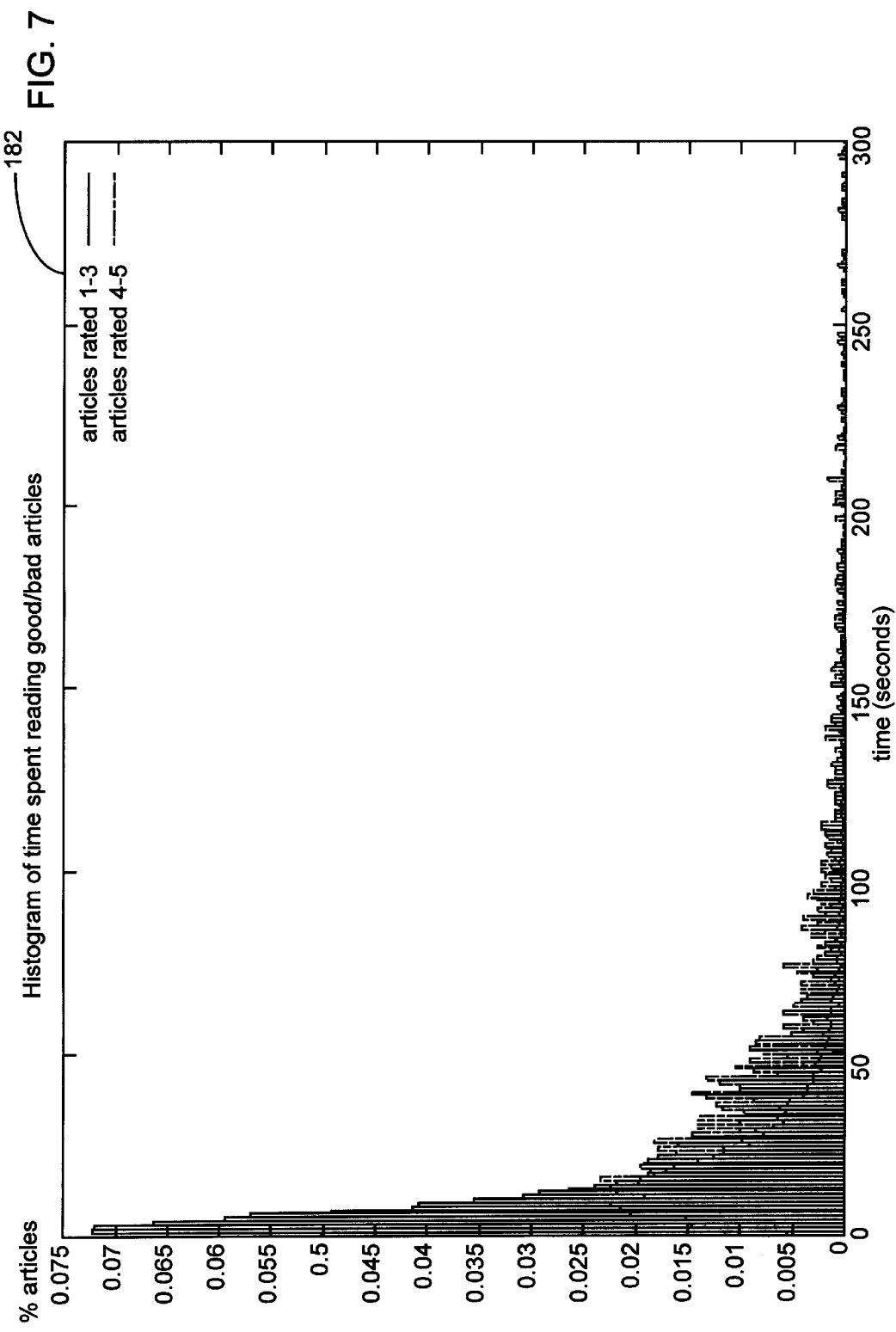
FIG. 7 shows a graph containing a histogram of signal and noise distributions for time spent reading.
Figure 9B:
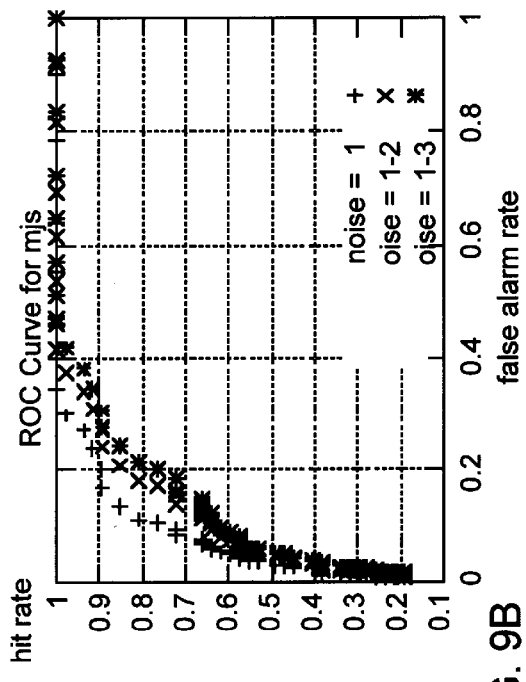
FIG. 9 shows a graph of ROCs for several users.
Figure 9D:
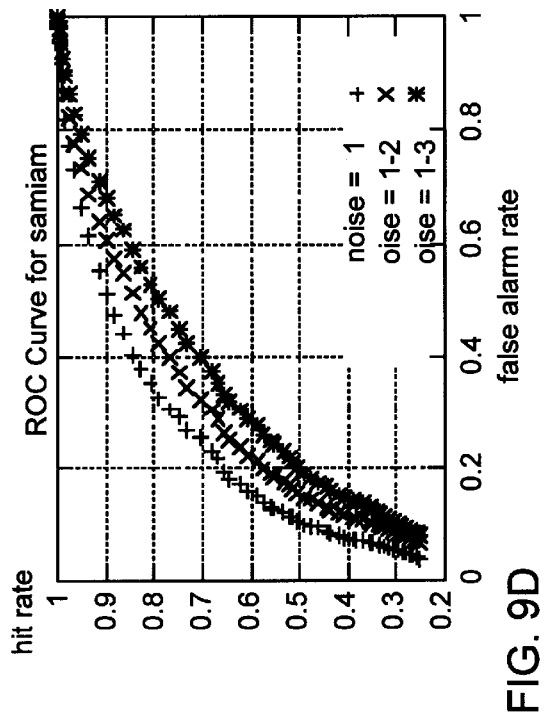
Figure 9A:
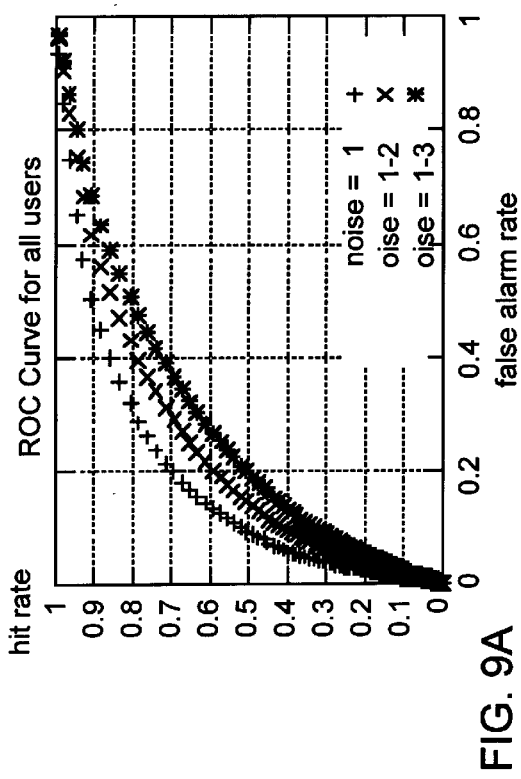
Figure 9C:
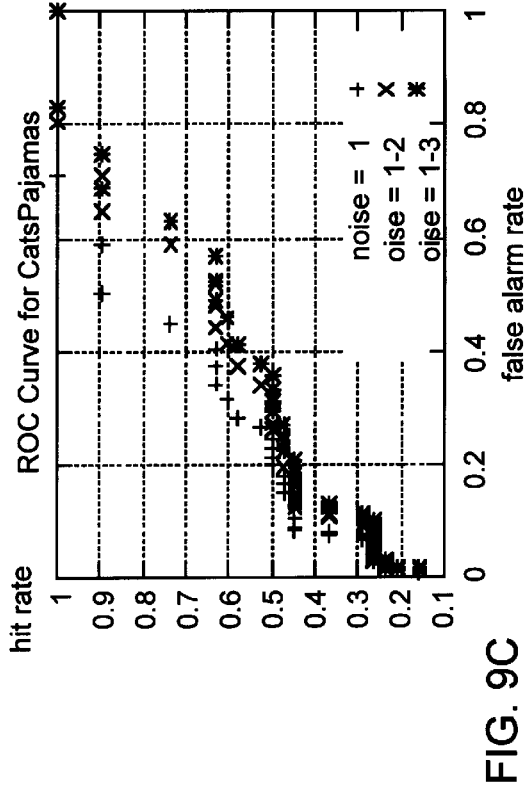

To select the operating point a graph is constructed that contains a noise distribution and a signal distribution. In FIG. 7, a graph 182 is shown containing the signal and noise distributions for TSR. In this case, the user's actual rating of the article is used to classify it as either signal or noise. Any article that receives a rating less than three is classified as noise and an article that receives a rating of four or more is classified as signal. The graph represents the proportion of the time that an article classified as signal or noise had the given TSR value. If all the values under each curve are added together, they will sum to 1.0.

Once the signal and noise curves are determined, the hit rate and the false alarm rate for a series of operating points can be calculated. The hit rate for a given operating point is determined by selecting a point on the x axis and calculating the area under the signal curve to the right of the operating point. The false alarm rate is determined by calculating the area under the noise curve to the right of the operating point. A Receiver Operating Curve (ROC) can be constructed by calculating hit rate and false alarm rate pairs for a sequence of operating points. The false alarm rate and hit rate correspond to the x and y coordinates of points on the ROC. The ROC 184 for the histogram 182 is shown in FIG. 8. The area under the ROC 184 defines the sensitivity of the system. The higher the sensitivity, the better the system is at discriminating between signal and noise.

The ROC 184 can be used to directly select an appropriate threshold for creating a two valued rating. Good thresholds are points near the "knee" 186 of the curve 184. In FIG. 8, an operating point corresponding to a reading time of 12 seconds is chosen, which gives a hit rate of 0.47 and a false positive rate of 0.18. Any article with a reading time of more than 12 seconds will receive a rating of 2 and any article with a reading time of 12 seconds or less will receive a rating of 1.

In studying TSR, it was noted that different users are more or less sensitive to the time spent reading. Also, it was noted that how signal and noise are defined will make the system appear to be more or less sensitive. In FIG. 9, ROCs for all users, and three specific users are shown. In each case, three different curves are shown where the top curve (the most sensitive) represents the condition where noise is defined to be a rating of 1 and signal to be a rating of 4 or 5 (ignoring 2 and 3). The bottom curve (the least sensitive) represents the condition where noise is defined to be ratings of 1–3 and signal to be ratings of 4 or 5.

Indirectly Using Rocs to Convert Implicit Measures to Ratings

Using the stored ratings and time values, conditions can be created to compare time based ratings versus ratings entered by the user. These comparisons can be used to evaluate implicit ratings methods, and also as a means of determining the best thresholds for converting implicit measures into ratings.

There are many ways to analyze and compare the results of collaborative filtering algorithms. Some of the existing metrics include mean absolute error, mean squared error and the correlation between ratings and predictions.

The mean absolute error is computed by taking the absolute value of the difference between the prediction made for the user and the actual rating the user entered. The mean absolute error is the mean of all of these absolute differences. The lower the mean absolute error, the lower the error in each prediction. A weakness of the mean absolute error is that it does not measure the range of the errors. For this reason, mean absolute error is often combined with the standard deviation of the error. Another weakness of the mean absolute error is that it does not sufficiently penalize algorithms that make large errors. It is desirable to penalize large errors more than small errors, because large errors are more likely to lead users to incorrect sampling decisions. The mean squared error is similar to mean absolute error, except that it squares each of the individual absolute errors before computing the mean. Mean squared error, similar to least squares regression, disproportionately penalizes algorithms that make large errors more than small. Mean squared error is a better metric, but, like all other known metrics, it is not directly measuring what users care about: How often does the prediction system lead them to make the correct selection decision? The same sensitivity measurement from signal detection theory that was used to directly convert implicit measures into implicit ratings is also a good metric for comparing collaborative filtering prediction algorithms. The ROC metric directly measures the success of the selection decisions for users.

Figure 10:
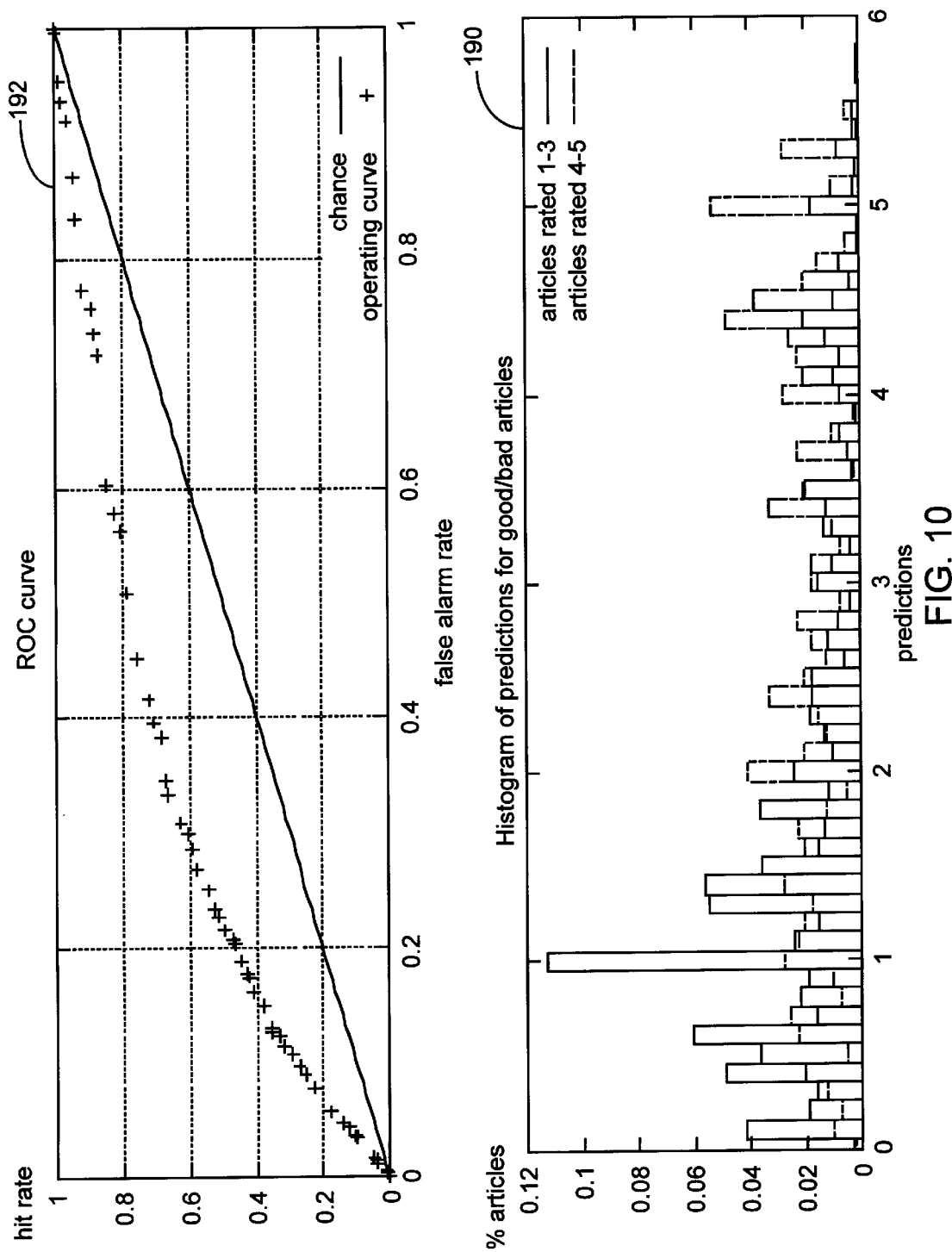
FIG. 10 shows a graph of containing a histogram of signal and noise distributions of predictions for articles and an ROC mapped from the histogram.

To construct an ROC for a group of predictions, a list that contains (prediction, rating) pairs for a group of articles is first generated. Each element of the list is then classified as signal or noise based on the rating. If the user rated an article a one, two, or three, then that article is classified as noise. If the user rated the article a four or five, then the article is classified as a signal. Subsequently, the signal and noise curves can be generated by putting the predictions into intervals, and calculating the proportion of predictions that fall within each interval. The ROC is constructed by moving the operating point from zero to five, in small increments, and empirically calculating the area under each curve. FIG. 10 shows the signal and noise curves (displayed as histograms 190) along with the resulting ROC 192 for a humor newsgroup.

The ROCs reveal much about the characteristics of the underlying prediction algorithms. For example, in the ROC graph 194 shown in FIG. 11 the straight line 196 from 0,0 to 1,1 is the chance line. The chance line represents how sensitive an algorithm would be if it just produced random ratings. The ROC 194 also lets you see how many hits or false alarms would occur if a user read every article with a prediction greater than the selected operating point. For example in FIG. 11 if all articles with a prediction greater than 2.25 are read, then a user will get a hit rate of 80% and a false alarm rate of 30%. Finally, the number of distinct operating points along the curve details the algorithm's flexibility. If there are only a few operating points that means that the algorithm is not producing a wide range of predictions.

ROCs can be used to evaluate the quality of predictions made using implicit ratings versus the quality of predictions made using explicit ratings. For instance, FIG. 13 uses ROCs to compare three prediction systems. The first, called traditional in FIG. 13, uses a user's own explicit ratings to define signal and noise for predictions based on other people's explicit ratings. The second uses a user's own explicit ratings to define signal and noise for predictions based on other people's time spent reading. The third uses a user's own time spent reading to define signal and noise for predictions based on other people's time spent reading. The graph shows that all three prediction methods produce results of similar quality for this application. The predictions based on explicit ratings do very slightly better than the predictions based on implicit ratings on the right half of the graph. However, in the left half of the graph the curves are nearly indistinguishable. For this application, users are likely to be happier with predictions based on implicit ratings, since those predictions give them nearly all of the value of predictions based on explicit ratings, with no effort.

The graph also shows that time spent reading can be used as another method of classifying signal and noise for this application. The two curves using predictions based on time spent reading differ only in that one uses explicit ratings as a signal and noise classifier, while the other uses time spent reading. The two curves are nearly indistinguishable, showing that for this application time spent reading is an effective signal and noise classifier. Having an alternative to explicit ratings for a signal and noise classifier is valuable, since the act of rating can influence the value of the item to the user, potentially skewing the results.

ROCs can be used to test this skew effect and similar effects for prediction systems. For instance, FIG. 12 is a study of the effect of seeing a prediction on the ratings users enter. In some applications, seeing a prediction might significantly change a user's perception of the item, causing him to enter biased ratings. FIG. 12 shows two ROCs, one for users who had not seen predictions before entering a rating, and one for users who had seen predictions before entering a ratings. For this application, the two curves are nearly identical, indicating there is not significant prediction bias.

These evaluations enable systems builders to make tradeoffs between effort from their users and the quality of the predictions or recommendations they are able to deliver to the users. The quality of different prediction systems is compared by plotting their ROCs on the same axes, and studying the regions in which each curve dominates the other.

ROCs can also be used to construct cutoffs for implicit ratings systems. Based on a history of user ratings, different methods for interpreting TSR and other implicit measurements can be compared. ROCs can be created for each method, and the method that produces the most attractive control points for an application can be selected.

Issues in Converting Implicit Measures Into Ratings

There are several additional issues in converting implicit measures into ratings. For instance, in many applications there will be multiple domains of items. For instance, in Usenet news there are multiple newsgroups, each with items on different topics. Different methods may be appropriate for converting implicit measures into ratings in each domain. ROCs can be used to select the best technique in each domain.

In many domains, implicit measures may be skewed by unexpected user behaviors. For instance, users may answer the phone while reading a news article. Alternately, a user may forward a document to a friend with an introduction like "Look how stupid this document is!". The implicit ratings system might think both of these documents are very interesting to the user, while the user actually finds them both completely uninteresting. False negatives are also possible in some interfaces. For instance, a user may see a very interesting item and decide to read it later because he does not have time to study it carefully right now. The system would measure the short time spent reading and incorrectly conclude the user did not find the document interesting. Overall, these effects may lead to implicit ratings systems that produce predictions that are not valuable to users. In these cases, implicit measures will have to be validated before being converted into ratings. For instance, if the TSR is larger than five minutes, it is discarded in the Usenet application. ROCs can be used to determine the most effective strategies for validating implicit measures.

In some domains, implicit measures must be translated based on characteristics of the item being perused. For instance, in Usenet articles are of varying lengths, which might effect TSR. One approach to translating TSR in this domain would be to adjust it for the length of the article. ROCs can be used to evaluate translation strategies.

Prediction Information System APIs and Functions

As previously noted, the principles of the present invention can be embodied in a series of application programming interfaces (APIs) and functions for use in the prediction information system. The following discussion will be focused on a prediction information system API which is implemented in the preferred embodiment as "GroupLens" components. GroupLens™ is a trademark of NetPerceptions, Inc. It will be appreciated by those skilled in the art that the functions and interfaces described hereinafter may be implemented in a different set of components without departing from the scope and spirit of the invention as claimed. Before getting into the specific details some concepts used in this API will be defined.

Users and Passwords

The prediction information system server 142 identifies users by a user identifier (ID) that can be selected by users or by the client application. In many cases, the user ID will be linked to customer account information, so other services can be provided to users. In some applications, users may prefer to control their privacy. In these cases, it is desirable to allow them to choose their own unique IDs.

Items

An item is a thing that is displayed to the end-user with predictions, and for which the end-user provides ratings. For example, in the domain of movies, each movie would be an item. An item must have a name. For the purposes of the preferred embodiment prediction information system 140 API, the name is a string that uniquely identifies the item and is no longer than GL_MAXITEMNAMELEN (currently 128 characters). For books, an ISBN would be a good name. No similar identifier currently exists for movies.

Partitions

A partition is a collection of items. In the domain of movies, a partition would be a category such as Action, Comedy, Drama, or Science Fiction. Partitions are used for scaling and to ensure that predictions are based on ratings that are appropriate. For example, a person's ratings for sports news may be useless for predicting the person's interest in movies.

By correctly partitioning the database of items, the prediction information system 140 server 142 can provide more accurate predictions than could be produced by an un-partitioned database.

An item may be in more than one partition. In the preferred embodiment, a partition must have a unique name that is no longer than GL_MAXGROUPNAMELEN (currently 128 characters).

Partition Handles

The API functions that deal with ratings and predictions take a partition handle as a parameter. This handle is similar to a file descriptor and is created by a GroupLens_OpenPartition function. The GroupLens_OpenPartition function opens a specified partition for a specified user. When the handle is no longer needed, it is destroyed with a GroupLens_ClosePartition function. Up to 50 partition handles may be open at one time in a thread.

Properties and Property Lists

Figure 11:
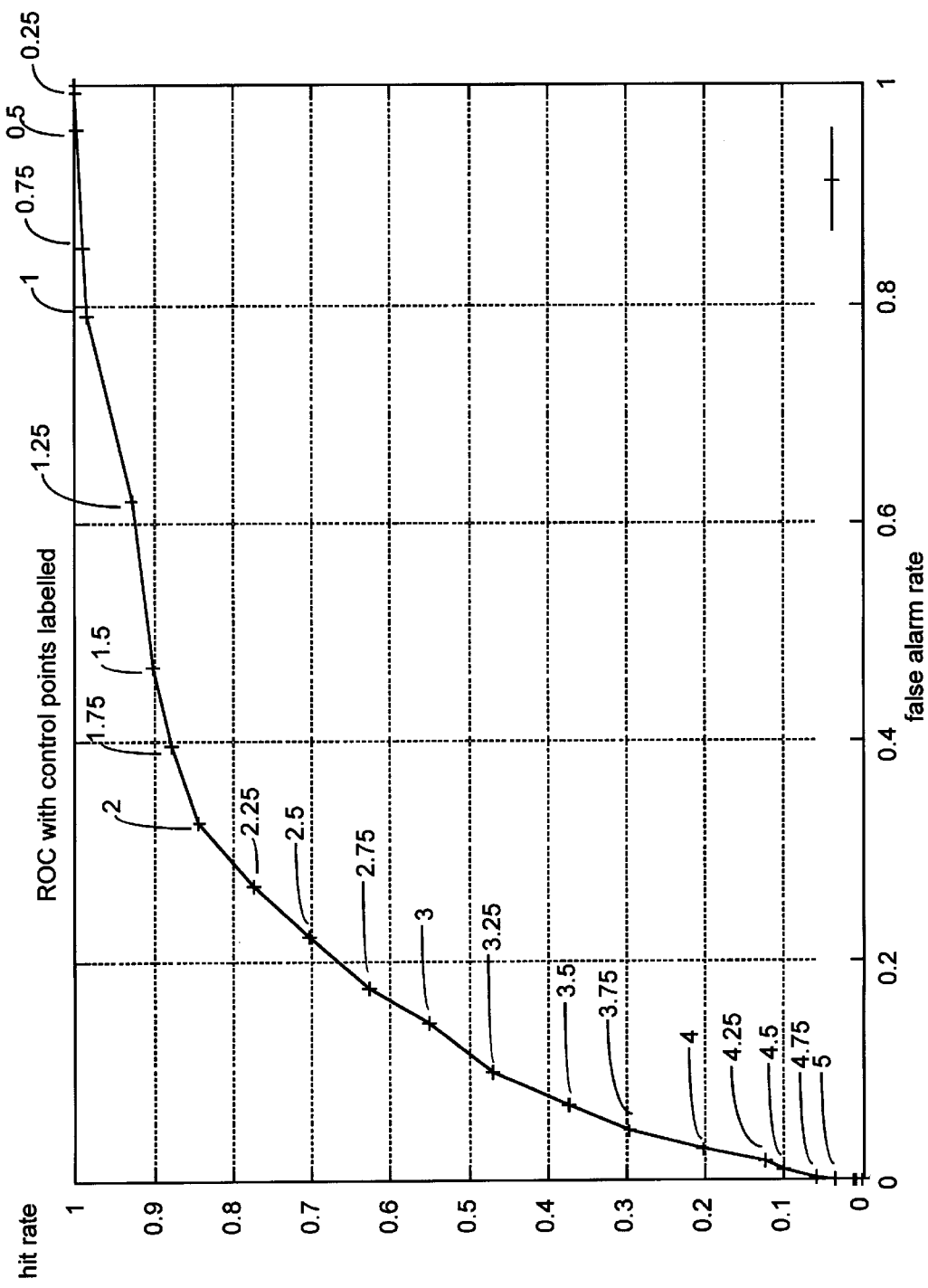
FIG. 11 shows a graph of an ROC for predictions from a prediction system using explicit ratings to characterize signal and noise.
Figure 14:
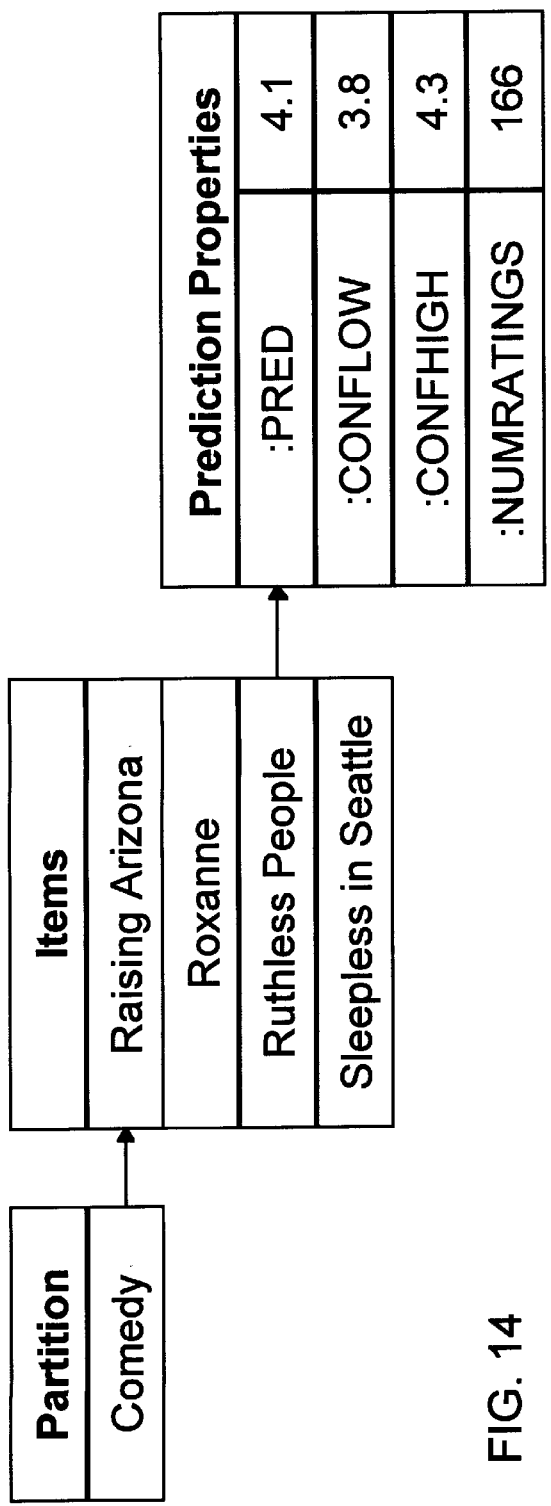
FIGS. 14 and 15 are block diagrams showing the relationship between the partitions, items, and properties using the domain of movies as an example.
Figure 15:
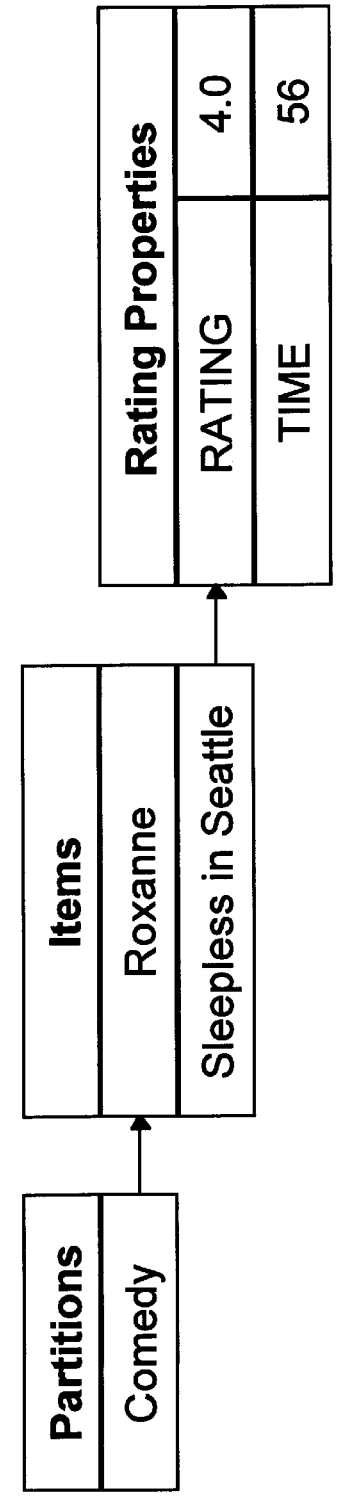

Data associated with an item is handled in a property list. A property list contains zero or more identifier/value pairs, where the property identifier is a key associated with the value. For example, properties of an item prediction include the prediction itself, a lower confidence bound, and a higher confidence bound. FIGS. 11 and 12 are block diagrams showing the relationship between the partitions, items, and properties using the domain of movies as an example. More specifically FIG. 14, shows Groups, Items, and Properties in the Prediction Buffer and FIG. 15 shows Groups, Items, and Properties in the Rating Buffer.

Property lists are central to the prediction information system 140 API. All information about an item that is received from or sent to the prediction information system server 142 is handled in the form of a property list. Properties provide considerable flexibility to applications.

Table 2 shows the current properties supported by the prediction information system server 142. Each property has the following information:

Property ID. A symbolic constant that is used in all API calls requiring a property ID. These constants are defined in GroupLens.h.

Property Name. A text representation of the symbolic constant. While the Property ID and Property Name look the same in the table, the former is translated to an integer while the latter is a string. The Property Name is useful in error messages.

Property Type. A type assigned to the property indicating what it is used for.

Value Type. The type of the property value, allowing type checking.

Description. A text description of the meaning of the property.

The GL_PRED and GL_RATING properties specify a prediction and a rating, respectively. Both of these properties use a 0–5 scale, where 0 means that the item has no prediction/rating, 1 is the lowest prediction/rating, and 5 is the highest. Actual predictions and ratings are floating point numbers between 1 and 5.

Most client applications will most often use PropertyIDs to interact with the prediction information system 140 API. Some available functions convert PropertyIDs to names, types, or descriptions.

TABLE 2

| Property ID | Property Name | Property Type | Value Type | Description |
|---|---|---|---|---|
| GL_PRED | GL_PRED | GL_PRED_PROP | GL_FLOAT | The prediction for a user and item. |
| GL_CONFLOW | GL_CONFLOW | GL_PRED_PROP | GL_FLOAT | The lower bound of the confidence interval. |
| GL_CONFHIGH | GL_CONFHIGH | GL_PRED_PROP | GL_FLOAT | The upper bound of the confidence interval. |
| GL_PREDTYPE | GL_PREDTYPE | GL_PRED_PROP | GL_STRING | The type of prediction. |
| GL_RATING | GL_RATING | GL_RATING_PROP | GL_FLOAT | The explicit rating specified by the user for the item. |
| GL_TIME | GL_TIME | GL_RATING_PROP | GL_INTEGER | The amount of time the user spent looking at the item. |
| GL_TEXT | GL_TEXT | GL_GENERAL_PROP | GL_STRING | A general-purpose text property. |
| GL_NUMRATINGS | GL_NUMRATINGS | GL_PRED_PROP | GL_INTEGER | The number of ratings on which the prediction is based. |

Caches and Buffers

A prediction is retrieved with one of the GroupLens_GetPredictionProperty functions. To improve performance, predictions are maintained inside the API in a prediction cache. This cache stores predictions that have already been received from the prediction information system server 142 for local access as needed. The cache can be filled either by a batch process or one at a time, with the batch process being far more efficient.

The prediction cache is filled in a batch as follows: Add items to the prediction fetch list using calls (one per item) to GroupLens_AddItemToPredictionFetchList.

Fetch all of the items in the list using a single call to GroupLens_FetchPredictions.

If one of the GroupLens_GetPredictionProperty functions is called and the item is not in the buffer, a fetch for that single item is automatically performed. If the application only needs one or two predictions for each interaction with the user, the predictions may be accessed one-at-a-time. Many applications require a batch of 100 or more predictions for each interaction with the user. These applications are much faster if they use pre-fetching.

The Top N cache is similar to the prediction cache. You can access item names and properties of the top N items by using calls to GroupLens_GetTopNItemName and the GroupLens_GetTopNProperty functions, respectively. The cache can be filled by a call to GroupLens_FetchTopN, improving performance for Top N lists with more than two or three items.

Ratings are placed in a rating buffer one at a time. The GroupLens_FlushRatings function is provided to allow an explicit flush. Flushing often reduces the risk of lost ratings in case the computer crashes, and makes ratings available to other users faster, but slows the performance of the application. In most applications, flushing after every logical group of ratings is a satisfactory balance between reliability and performance. The API may choose to flush at other times, for memory management or performance purposes. The API typically flushes the rating buffer when GroupLens_ClosePartition is called.

Name Server Location

The API can get the network location of the prediction information system name server 174 in either of two ways. The first method is to have two environment variables set: GL_NSHOST with the name of the name server host, and GL_NSPORT with name server port number. The other method of specifying the name server location is to use a call to GroupLens_SetNameServer. If neither method is used, the API will try to find the name server at host "localhost" and port 9000.

Return Values

The values returned by prediction information system 140 API functions depend on the type of function. The following are four categories that all API functions fit into:

Boolean functions. The primary purpose of these functions is to return True or False. If there is an error that prevents the function from accurately computing the correct value to return, it will return GL_FAILURE (−1). Example: GroupLens_IsGroupLensPartition.

General Procedures. The primary purpose of these functions is to perform a task. The return value indicates whether the task was successfully completed. These functions return GL_SUCCESS (1) if the function completed successfully and GL_FAILURE (−1) if there was an error. Example: GroupLens_FlushRatings.

Procedures Retrieving Item Information. These are procedures that get item property information. They are the same as general procedures except that they return GL_NOTFOUND (0) if the item is not in the prediction information system database 166, or the requested property value is not available. Example: GroupLens_GetPredictionPropertyInt.

Functions returning identifiers. The purpose of these functions is to return an integer identifier. Valid identifiers are zero or greater. These functions return a non-negative integer if successful and GL_FAILURE (−1) if not successful. Example: GroupLens_GetPropertyID.

Error Messages

Error messages generated by the prediction information system 140 API are accessed using the GroupLens_GetErrorMsg function. Error codes may are accessed with the GroupLens GetErrorNumber function. A return value of GL_FAILURE from a prediction information system 140 API function indicates that there may be an error message and error code available.

Thread Contexts

Since the prediction information system 140 API must operate as part of a multithreaded application, all API functions are thread-safe. Context information for a thread is stored in an internal structure called a thread context. Any application operating in a multithreaded environment must create a thread context at the beginning of each function and delete it before exiting the function. Threads are created and deleted using the GroupLens_CreateThreadContext and GroupLens_DeleteThreadContext functions, respectively. Applications that are single threaded do not need to call these functions.

Types

The enum type in Table 3 specifies the property type which is the use for the property.

TABLE 3

```
typedef enum {
    GL_RATING_PROP,
    GL_PRED_PROP,
    GL_REGISTER_PROP,
    GL_LOGIN_PROP,
    GL_GENERAL_PROP,
    GL_TOPN_PROP
} GroupLens_PropertyType ;
```

The enum type in Table 4 specifies the value type which is the type of value associated with a property. For example, GL_PRED is a prediction property (GL_PRED_PROP) that has a floating point value (GL_FLOAT).

TABLE 4

```
typdef enum {
    GL_NOVALUE,
    GL_STRING,
    GL_INTEGER,
    FL_FLOAT
} GroupLens_ValueType ;
```

Constants

The following are values returned by prediction information system 140 API functions.

True (1)

False (0)

Return values from Boolean prediction information system 140 API functions. If either of these values is returned, the function completed successfully.

GL_SUCCESS (1)

A return value from some prediction information system 140 API functions. Indicates that the function completed successfully.

GL_FAILURE (−1)

A return value from all prediction information system 140 API functions. Indicates that the function has failed.

GL_NOTFOUND (0)

A return value from the GroupLens_GetPredictionProperty and GroupLens_GetTopNProperty functions indicating that the function completed successfully but the item referenced is not in the database, or the property referenced is not available.

The following constants can be used to declare string buffers that will be large enough to handle any value returned by the associated function(s). These sizes include room for a terminating null.

GL_PREDSTRINGSIZE (13)

The buffer size required for a display string returned by GroupLens_GetDisplayString.

GL_MAXPROPERTYNAMELEN (32)

The buffer size required for a property name returned by GroupLens_GetPropertyName.

GL_MAXPROPERTYDESCLEN (256)

The maximum length of a property description.

GL_MAXPROPERTYVALUELEN (512)

The maximum length of a string property value.

GL_MAXITEMNAMELEN (128)

The maximum length of an item name.

GL_MAXPARTITIONNAMELEN (128)

The maximum length of a partition name.

GL_MAXUSERLEN (64)

The maximum length of a user ID.

GL_MAXPASSWORDLEN (64)

The maximum length of a password.

GL_MAXUSERPARTITIONS (50)

The maximum number of open partition handles in a thread.

Developing a Prediction Information System Application

In this section we provide an overview of what is needed to incorporate prediction information system technology into a client application. The API is designed to be easy to use and require as little understanding of the underlying prediction information system technology as possible. The programming described in this section will be sufficient for most client applications. Additional functions, which are discussed only in the Function Reference section, are provided for some additional development needs.

Using prediction information system 140 API functions requires that an appropriate library is added to the application's list of link libraries. In addition, a GroupLens.h file must be included in each module using API function calls. Also, the function calls themselves must be added to the application code.

Some key rules for creating a function using the prediction information system 140 API for single and multi-threaded applications are as follows.

If the application is multithreaded, the first prediction information system 140 function call must be to GroupLens CreateThreadContext and the last function call, along any return path, must be GroupLens_DeleteThreadContext. If the application is single threaded, neither function call is required, but including them will not do any harm. The application must open one or more partitions using the GroupLens_OpenPartition function. The GroupLens_ClosePartition must be called prior to returning from the function.

The following in Table 5 are pseudocode examples of three functions: one that gets the Top N items for the user in a partition, one that gets predictions for a pre-defined set of items, and one that sends ratings to the prediction information system server 142. Actual 'C' language examples are provided in the Function Reference section.

TABLE 5

```
TopNFunction
    {
    GroupLens_CreateThreadContext
    GroupLens_OpenPartition
    GroupLens_FetchTopN
    for each of the items retrieved;
        GroupLens_GetTopNItemName
        GroupLens_GetTopNProperty
        Use the prediction as desired
    GroupLens_ClosePartition
    GroupLens_DeleteThreadContext
    }
GetPredictionsFunction
    {
    GroupLens_CreateThreadContext
    GroupLens_OpenPartition
    for each item:
        GroupLens_AddItemToPredictionFetchList
    GroupLens_FetchPredictions
    for each of the items retrieved;
        GroupLens_GetPredictionProperty
        Use the prediction as desired
    GroupLens_ClosePartition
    GroupLens_DeleteThreadContext
    }
RatingFunction
    {
    GroupLens_CreateThreadContext
    GroupLens_OpenPartition
    for each item:
        GroupLens_SetRatingProperty
    GroupLens_FlushRatings
    GroupLens_ClosePartition
    GroupLens_DeleteThreadContext
    }
```

Function Summaries

Partition Functions

GL_HANDLE GroupLens_OpenPartition
(char *PartitionName, char *User, char *Password);

Opens a prediction information system 142 partition for the specified user.

void GroupLens_ClosePartition (GL_HANDLE Partition)

Closes the specified partition for the user for which it had been opened.

Server Functions int GroupLens_ChangePassword (char *User, char *OldPassword, char *NewPassword);

Changes the password for the specified user.

int GroupLens_IsGroupLensPartition(char *PartitionName);

Used to determine if the specified partition is handled by the prediction information system server 142.

int GroupLens_Register (char *User, char *Password);

Registers the specified user with the prediction information system server 142.

int GroupLens_SetNameServer(char *Host, int Port);

Changes the prediction information system name server 174 with which the client application communicates.

Property Information Functions int GroupLens_GetPropertyDescription (int PropertyID, char *Buffer, unsigned int BufferSize);

Gets the property description of the specified property.

int GroupLens_GetPropertyID(char *PropertyName)

Gets the numeric ID associated with a property name.

int GroupLens_GetPropertyName(int PropertyID, char *Buffer, unsigned int BufferSize);

Gets the property name associated with a property ID.

GroupLens_PropertyType GroupLens_GetPropertyType(int PropertyID);

Gets the property type of the specified property. The property type is what the property is used for, not what type the value is.

GroupLens_ValueType GroupLens_GetValueType(int PropertyID)

Gets the value type of the specified property.

Rating Functions int GroupLens_FlushRatings(GL_HANDLE hpartition)

Flushes the rating buffer, sending all rating information for the specified partition handle to the prediction information system server 142.

int GroupLens_SetRatingPropertyInt (GL_HANDLE hpartition, char *ItemName, int PropertyID, int Value);

int GroupLens_SetRatingPropertyFloat (GL_HANDLE hpartition, char *ItemName, int PropertyID, float Value);

int GroupLens_SetRatingPropertyString (GL_HANDLE hpartition, char *ItemName, int PropertyID, char *Value);

Sets a rating property for a specified item for the specified partition handle.

Prediction Functions int GroupLens_AddItemToPredictionFetchList (GL_HANDLE hpartition, char *ItemName);

Used to build the list of items for which predictions will be retrieved from the prediction information system server 142.

int GroupLens_FetchPredictions(GL_HANDLE hpartition);

Fetches predictions for the items in the fetch list.

int GroupLens_GetPredictionPropertyInt (GL_HANDLE hpartition, char *ItemName, int PropertyID, int *Value);

int GroupLens_GetPredictionPropertyFloat (GL_HANDLE hpartition, char *ItemName, int PropertyID, float *Value);

int GroupLens_GetPredictionPropertyString(GL_HANDLE hPartition, char *ItemName, int PropertyID, char *Buffer, unsigned int BufferSize);

Gets a property value for a specified item within the specified partition handle from the prediction cache.

Top N Functions int GroupLens_FetchTopN(GL_HANDLE hpartition, int FromRank, int ThruRank);

Fetches a segment of the Top N list for the specified partition handle, from one rank to another.

int GroupLens_GetTopNItemName(GL_HANDLE hpartition, int Rank, char *Buffer, unsigned int BufferSize);

Gets the item name for an item in the Top N list for the specified open partition.

int GroupLens_GetTopNPropertyInt (GL_HANDLE hpartition, int Rank, int PropertyID, int *Value);

int GroupLens_GetTopNPropertyFloat (GL_HANDLE hpartition, int Rank, int PropertyID, float *Value);

int GroupLens_GetTopNPropertyString (GL_HANDLE hpartition, int Rank, int PropertyID, char *Buffer, unsigned int BufferSize);

Gets a property value for an item in the Top N cache for the specified partition.

Message Functions int GroupLens_GetErrorMsg(char *MsgBuffer, unsigned int BufferSize)

Accessor function for any error messages recorded by prediction information system 140 API functions.

int GroupLens GetErrorNum(void);

Returns the numeric code for the last error recorded by the API functions.

Multithread Functions int GroupLens_CreateThreadContext( );

Creates a context for the current thread.

void GroupLens_DeleteThreadContext( );

Deletes the context for the current thread.

Function Reference

Functions in this section are listed alphabetically. The constants GOODGROUP, GOODHOST, GOODPORT, and ANITEMNAME are used in examples to represent appropriate values for a fictitious prediction system.

Grouplens_Additemtopredictionfetchlist int GroupLens_AddItemToPredictionFetchList (GL_HANDLE hpartition, char *ItemName);

hpartition The handle of an open partition.

ItemName The name of the specific item to be added to the fetch list. Often, this will be a string ID for the item.

Used to build the list of items for which predictions will be retrieved from the prediction information system server 142.

Return value

GL_SUCCESS if successful at adding the item, otherwise GL_FAILURE.

Remarks

To fetch the prediction data for items in the list, call GroupLens_FetchPredictions.

Example Code Shown in Table 6

TABLE 6

```
void Demo_GroupLens_AddItemToPredictionFetchList( )
{
    char ItemNames[4] [GL_MAXITEMNAMELEN+1] ;
    float Prediction, ConfLow, ConfHigh ;
    char ErrorMsg[256] ;
    GL_HANDLE hPartition ;
    int i, rc ;
    GroupLens_CreateThreadContext( ) ;
    hPartition = GroupLens_OpenPartition("Restaurants", "Eater10",
        "mypass") ;
    if ( hPartition == -1 ) {
        GroupLens_GetErrorMsg(ErrorMsg, 256) ;
        printf("Unable to open partition 'Restaurants' for Eater10.
Error msg = '%s'\n", ErrorMsg) ;
        return ;
    }
    strcpy(ItemNames[0], "Cafe10") ;
    strcpy(ItemNames[1], "Cafe20") ;
    strcpy(ItemNames[2], "Cafe30") ;
    strcpy(ItemNames[3], "Cafe40") ;
    /* Add items to the fetch list. */
```

TABLE 6-continued

```
    for ( i = 0; i < 4; i++) {
        rc = GroupLens_AddItemToPredictionFetchList(hPartition,
            ItemNames[i]) ;
        if ( rc != GL_SUCCESS ) {
            GroupLens_GetErrorMsg(ErrorMsg, 256) ;
            printf("%s\n", ErrorMsg) ;
            return ;
        }
    }
    /* Do the fetch. */
    rc = GroupLens_FetchPredictions(hPartition) ;
if ( rc != GL_SUCCESS) {
        GroupLens_GetErrorMsg(ErrorMsg, 256) ;
        printf("%s\n", ErrorMsg) ;
        return ;
    }
    /* Display rating data for each item. */
    for ( i = 0; i < 4; i++) {
        GroupLens_GetPredictionPropertyFloat(hPartition,
            ItemNames[i], GL_PRED, &Prediction) ;
        GroupLens_GetPredictionPropertyFloat(hPartition,
            ItemNames[i], GL_CONFLOW, &ConfLow) ;
        GroupLens_GetPredictionPropertyFloat(hPartition,
            ItemNames[i], GL_CONFHIGH, &ConfHigh) ;
        printf("%20s %4.2f (%4.2f, %4.2f)\n", ItemNames[i],
Prediction, ConfLow, ConfHigh) ;
    }
    printf("\n") ;
    GroupLens_ClosePartition(hPartition) ;
    GroupLens_DeleteThreadContext( ) ;
}
```

Grouplens_Changepassword int GroupLens_ChangePassword (char *User, char *OldPassword, char *NewPassword);

User The name of the user for whom to change the password.

OldPassword The current password.

NewPassword The new password.

Changes the password for the specified user.

Return Value

GL_SUCCESS if the password change is successful, GL_FAILURE otherwise.

Remarks

OldPassword must match the password on record for the change to occur.

Example

See example for GroupLens_SetNameServer.

Grouplens_Closepartition void GroupLens_ClosePartition (GL_HANDLE hpartition);

hpartition The handle of an open partition.

Closes the specified partition for the user for which it had been opened.

Return Value

None.

Remarks

Example

See example for GroupLens_AddItemToPredictionFetchList.

Grouplens_Createthreadcontext int GroupLens_CreateThreadContext( );

Creates a context for the current thread.

Return Value

GL_SUCCESS if creation of the thread context is successful, GL_FAILURE otherwise.

Remarks

In a multithreaded application, this function must be the first prediction information system 140 function called in a thread, and GroupLens_DeleteThreadContext must be the last prediction information system 140 function called. Neither function is required for single threaded applications.

Example

See example for GroupLens_AddItemToPredictionFetchList

Grouplens_Deletethreadcontext void GroupLens_DeleteThreadContext( );

Deletes the context for the current thread.

Return Value

None.

Remarks

In a multithreaded application, this function must be the last prediction information system 140 function called in a thread, and GroupLens_CreateThreadContext must be the first prediction information system 140 function called. Neither function is required for single threaded applications.

Example

See example for GroupLens_AddItemToPredictionFetchList.

Grouplens_Fetchpredictions int GroupLens_FetchPredictions(GL_HANDLE hpartition);

hpartition The handle of an open partition.

Fetches predictions for the items in the prediction fetch list.

Return Value

GL_SUCCESS if the predictions were successfully received, otherwise GL_FAILURE.

Remarks

While the predictions are retrieved into the prediction cache, when necessary, by one of the GroupLens_GetPredictionProperty functions, getting predictions for one item at a time is inefficient in terms of both network bandwidth and prediction information system server 142 processing. Placing items into the fetch list and then retrieving predictions in a batch using GroupLens_FetchPredictions is much more efficient.

Example

See example for GroupLens_AddItemToPredictionFetchList.

Grouplens_Fetchtopn int GroupLens_FetchTopN(GL_HANDLE hpartition, int FromRank, int ThruRank);

hpartition A handle to an open partition.

FromRank The rank of the first item to be fetched.

ThruRank The rank of the last item to be fetched.

Fetches a segment of the Top N list for the specified partition handle, from one rank to another.

Return Value

GL_SUCCESS if the segment of the Top N list, or any subset of it, was successfully received, otherwise GL_FAILURE.

Remarks

Ranks are 1-based. Therefore, the top 10 items in a partition would be retrieved using FromRank=1 and ToRank=10.

If fewer than ThruRank items have been rated for the group, the list returned may contain fewer than ThruRank−FromRank+1 items.

While the items are retrieved into the Top N cache, when necessary, by the GroupLens_GetTopNItemName and GroupLens_GetTopNProperty functions, retrieving items one at a time this way is much less efficient than retrieving the entire list using GroupLens_FetchTopN in terms of both network bandwidth and prediction information system server 142 processing.

Example

See example for GroupLens_GetTopNItemName.

Grouplens_Flushratings int GroupLens_FlushRatings(GL_HANDLE hpartition);

hpartition A handle to an open partition.

Flushes the rating buffer for the partition, sending all rating information to the prediction information system server 142.

Return Value

GL_SUCCESS if the flush is successful, otherwise GL_FAILURE.

Remarks

The current implementation allows flushing using this command or the GroupLens_ClosePartition command. In later versions, the buffer may be automatically, periodically flushed to optimize use of system resources.

Example

See example for GroupLens_SetRatingProperty.

Grouplens_Geterrormsg int GroupLens_GetErrorMsg(char *MsgBuffer, unsigned int BufferSize);

MsgBuffer The buffer in which to return the message.

BufferSize The size of the buffer.

Accessor function for any error messages recorded by prediction information system 140 API functions.

Return Value

GL_SUCCESS if successful, GL_FAILURE otherwise.

Remarks

Example

See example for GroupLens_AddItemToPredictionFetchList.

Grouplens_Getpredictionproperty int GroupLens_GetPredictionPropertyInt (GL_HANDLE hpartition, char *ItemName, int PropertyID, int *Value);

int GroupLens_GetPredictionPropertyFloat (GL_HANDLE hpartition, char *ItemName, int PropertyID, float *Value);

int GroupLens_GetPredictionPropertyString (GL_HANDLE hpartition, char *ItemName, int PropertyID, char *Buffer, unsigned int BufferSize);

hpartition A handle to an open partition.

ItemName The name of the specific item for which a property is being set.

PropertyID A numeric property ID. You will usually use the named constants for the prediction information system 140 properties.

Value The value to be associated with the property. Must be allocated by the caller. This value is strongly typed, hence there are three functions.

Buffer The buffer in which to return a string value. Used instead of Value in GroupLens_GetPredictionPropertyString.

BufferSize The size of the buffer. Used only in GroupLens_GetPredictionPropertyString.

Gets a property value for a specified item within the specified partition from the prediction buffer.

Return Value

GL_SUCCESS if successful at getting the property value, GL_NOTFOUND if the specified item does not exist in the prediction information system 166 database, or GL_FAILURE if there was an error. The property value is returned in the Value or Buffer parameter.

Remarks

For a string, the argument should be a string of at least size GL_MAXPROPERTYVALUELEN. The value type of the property must agree with the function used. You can find the value type by calling GroupLens_GetPropertyValueType for the PropertyID.

Example

See example for GroupLens_AddItemToPredictionFetchList.

Grouplens_Getpropertydescription int GroupLens_GetPropertyDescription (int PropertyID, char *Buffer, unsigned int BufferSize);

PropertyID A numeric property ID.

Buffer A buffer in which the description string will be returned.

BufferSize The size of the buffer.

Gets the property description of the specified property.

Return Value

GL_SUCCESS if PropertyID is valid, otherwise GL_FAILURE.

Remarks

The property description will be no longer than GL_MAXPROPERTYDESCLEN in length. Therefore, the buffer should be at least GL_MAXPROPERTYDESCLEN+1 in length.

Example

See example for GroupLens_GetPropertyID.

Grouplens_Getpropertyid int GroupLens_GetPropertyID (char *PropertyName);

PropertyName A string, beginning with a colon, specifying the name of a property. See the list of properties in Table 2.

Gets the numeric ID associated with a property name.

Return Value

The integer ID if the property is found, otherwise GL_FAILURE (−1).

Remarks

Example Code Shown in Table 7

TABLE 7

```
void Demo_GroupLens_GetPropertyID( )
{
  int PropertyID ;
  char PropName[GL_MAXPROPERTYNAMELEN] ;
  char PropDesc[GL_MAXPROPERTYDESCLEN] ;
  GroupLens_PropertyType PropType ;
  GroupLens_ValueType ValueType ;
  PropertyID = GroupLens_GetPropertyID("GL_PRED") ;
  if ( PropertyID == −1 ) {
    printf("GL_PRED is not a valid property name.") ;
    return ;
  }
  GroupLens_GetPropertyName (PropertyID, PropName,
      GL_MAXPROPERTYNAMELEN) ;
  GroupLens_GetPropertyDescription(PropertyID, PropDesc,
```

TABLE 7-continued

```
      GL_MAXPROPERTYDESCLEN) ;
  PropType = GroupLens_GetPropertyType(PropertyID) ;
  ValueType = GroupLens_GetValueType(PropertyID) ;
  if ( (strlen(PropName) == 0) || (strlen(PropDesc) == 0) ||
      (PropType == −1) || (ValueType == −1) ) {
    printf("%d is not a valid property ID.", PropertyID) ;
    {
  else }
    printf("%s: Property type = %d, Value type = %d, Description
= '%s'\n\n", PropName, PropType, ValueType, PropDesc) ;
    }
  printf("\n") ;
  }
```

Grouplens_Getpropertyname int GroupLens_GetPropertyName(int PropertyID, char *Buffer, unsigned int BufferSize);

PropertyID A numeric property ID.

Buffer A buffer in which the property name will be returned.

BufferSize The size of the buffer.

Gets the property name associated with a property ID.

Return Value

GL_SUCCESS if PropertyID is valid, otherwise GL_FAILURE.

Remarks

The property name will be no longer than GL_MAXPROPERTYNAMELEN. Therefore, the buffer should be at least GL_MAXPROPERTYNAMELEN+1 in length.

Example

See example for GroupLens_GetPropertyID.

Grouplens_Getpropertytype

GroupLens_PropertyType GroupLens_GetPropertyType (int PropertyID);

PropertyID A numeric property ID.

Gets the property type of the specified property.

Return Value

An value of enum type GroupLens_PropertyType specifying the type if the property ID is valid, otherwise GL_FAILURE.

Remarks

Permissible property IDs are shown in Table 2.

Example

See example for GroupLens_GetPropertyID.

Grouplens_Gettopnitemname int GroupLens_GetTopNItemName(GL_HANDLE hpartition, int Rank, char *Buffer, unsigned int BufferSize);

hpartition The handle of an open partition.

Rank The one-based rank of the item in the Top N list.

Buffer The buffer in which to return the item name.

BufferSize The size of the buffer.

Gets the item name for an item in the Top N list for the specified partition.

Return Value

GL_SUCCESS if the item name is successfully retrieved, otherwise GL_FAILURE.

Remarks

The ItemName buffer should be at least GL_MAXITEMNAMELEN characters.

The rank is one-based, hence ranks for a Top 10 list will be 1 to 10.

Example Code Shown in Table 8

TABLE 8

```
void Demo_GroupLens_GetTopNItemName( )
    {
    float Pred, ConfLow, ConfHigh ;
    char ItemName[GL_MAXITEMNAMELEN] ;
    GL_HANDLE hPartition ;
    char ErrorMsg[256] ;
    int rc, j ;
    GroupLens_CreateThreadContext( ) ;
    hPartition = GroupLens_OpenPartition("Restaurants", "Eater10",
        "mypass") ;
    if ( hPartition == -1 ) {
        GroupLens_GetErrorMsg(ErrorMsg, 256) ;
        printf("Unable to open partition 'Restaurants' for Eater10.
Error msg = '%s'\n", ErrorMsg) ;
        return ;
        }
    printf("Top 20 'Restaurants' for Eater10:\n") ;
    GroupLens_FetchTopN(hPartition, 1, 20) ;
    for ( j = 1; j <= 20; j++ ) {
        rc = GroupLens_GetTopNItemName(hPartition, j, ItemName,
            GL_MAXITEMNAMELEN) ;
        if ( rc != GL_SUCCESS ) {
            GroupLens_GetErrorMsg(ErrorMsg, 256) ;
            printf("Error getting Top 20 restaurants: '%s'\n",
ErrorMsg) ;
            break ;
            }
        else if ( ItemName[0] == 0 ) {
            printf("Item #%d is not in the Top 20 list.\n", j) ;
            break ;
            }
        GroupLens_GetTopNPropertyFloat(hPartition, j, GL_PRED,
            &Pred) ;
        GroupLens_GetTopNPropertyFloat(hPartition, j, GL_CONFLOW,
            &ConfLow) ;
        GroupLens_GetTopNPropertyFloat(hPartition, j, GL_CONFHIGH,
            &ConfHigh) ;
        printf("Item #%d; ItemName=%s; Prediction=%4.2f; Conf.
Low=%4.2f; COnf. High=%4.2f\n", j, ItemName, Prd, ConfLow,
ConfHigh) ;
        }
    printf("\n") ;
    GroupLens_ClosePartition(hPartition) ;
    GroupLens_DeleteThreadContext( ) ;
    }
```

Grouplens_Gettopnproperty int GroupLens_GetTopNPropertyInt (GL_HANDLE hPartition, int Rank, int PropertyID, int *Value);
int GroupLens_GetTopNPropertyFloat (GL_HANDLE hPartition, int Rank, int PropertyID, float *Value);
int GroupLens_GetTopNPropertyString (GL_HANDLE hpartition, int Rank, int PropertyID, char *Buffer, unsigned int BufferSize);

hpartition The handle of an open partition.
Rank The one-based rank of the item in the Top N list.
PropertyID A numeric property ID. You will usually use the named constants for the prediction information system 140 properties.
Value The value to be associated with the property. Must be allocated by the caller. This value is strongly typed, hence there are three functions.
Buffer The buffer in which to return a string value. Used instead of Value in GroupLens_GetTopNPropertyString.
BufferSize The size of the buffer. Used only in GroupLens_GetTopNPropertyString.

Gets a property value for an item in the Top N cache for the specified partition.

Return Value

GL_SUCCESS if successful at getting the property value, GL_NOTFOUND if there is no item at the specified Rank, or GL_FAILURE if there was an error. The property value is returned in the Value parameter.

Remarks

The value type of the property must agree with the function used. For a string, the argument should just be a string of at least size GL_MAXSTRINGVALUELEN. You can find the value type by calling GroupLens_ GetPropertyValueType for the PropertyID.

Example

See example for GroupLens GetTopNItemName.

Grouplens_Getvaluetype

GroupLens_ValueType GroupLens_GetValueType(int PropertyID);
PropertyID A numeric property ID.
Gets the value type of the specified property.

Return Value

An value of enum type GroupLens_ValueType specifying the value type if the property ID is valid, otherwise GL_FAILURE.

Remarks

Permissible property IDs are discussed in Table 2.

Example

See example for GroupLens_GetPropertyID.

Grouplens_Isgrouplenspartition int GroupLens_IsGroupLensPartition(char *PartitionName);

PartitionName The name of a prediction information system 140 partition.

Used to determine if the specified partition is handled by the prediction information system server 142.

Return Value

True if the specified partition is handled by the prediction information system server 142, False if not, and GL_FAILURE if there was an error that prevented the function from determining whether the partition is handled by the prediction information system server 142.

Remarks

Some applications will only apply prediction information system 140 functions to some of the available partitions. This function is useful for determining which partitions are handled by the prediction information system 140 and which are not.

Example code shown in Table 9

The following example prints out the name of the partition. If the partition is handled by prediction information system 140, "(This is a prediction information system partition)" is appended.

TABLE 9

```
void Demo_GroupLens_IsGroupLensGroup( )
    {
    char PartitionName[GL_MAXPARTITIONNAMELEN] ;
    char ErrorMsg[256] ;
    int rc ;
    GroupLens_CreateThreadContext( ) ;
    strcpy(PartitionName, "Restaurants") ;
    rc = GroupLens_IsGroupLensPartition(PartitionName) ;
    if ( rc == True ) {
        printf("%s (This is a prediction information system
partition)\n", PartitionName);
        }
    else if ( rc == GL_FAILURE ) {
        GroupLens_GetErrorMsg(ErrorMsg, 256) ;
        printf("Error testing GroupLens_IsGroupLensPartition:
'%s'\n", ErrorMsg);
        }
    else {
        printf("%s", PartitionName);
        }
    printf("\n") ;
    GroupLens_DeleteThreadContext( ) ;
    }
```

Grouplens_Openpartition

GL_HANDLE GroupLens_OpenPartition(char *PartitionName, char *User, char *Password);

PartitionName The name of a prediction information system 140 partition.

User The user ID of the user for whom the partition is being opened.

Password The password of the user for whom the partition is being opened.

Opens a prediction information system 140 partition for the specified user.

Return Value

The handle of the opened partition, or GL_FAILURE if the open failed.

Remarks

This function must be called prior to using any function that takes a partition handle (GL_HANDLE) as a parameter.

A partition handle is specific to a user and partition. Hence, an operation on a partition handle deals with ratings or predictions specific to that user and partition. Cross-user and cross-partition operations are performed by the application getting multiple handles, performing separate operations on each handle, and merging the results as desired. A maximum of GL_MAXUSERPARTITIONS partition handles may be open in a thread at one time.

Example

See example for GroupLens_AddItemToPredictionFetchList.

GROUPLENS_REGISTER int GroupLens_Register (char *User, char *Password);

User The name of the user to register.

OldPassword The password of the user in the partition.

Registers the specified user with the prediction information system server 142.

Return Value

GL_SUCCESS if registration is successful, otherwise GL_FAILURE.

Remarks

Each user only needs to be registered once. Registering a user more than once doesn't hurt anything, but takes a little time.

Example

See example for GroupLens_SetNameServer.

GROUPLENS_SETNAMESERVER int GroupLens_SetNameServer(char *Host, int Port)

Host The host name of the prediction information system server 142

Port The port number of the prediction information system server 142

Changes the prediction information system server 142 with which the client application communicates.

Return Value

GL_SUCCESS if the change is successful, otherwise GL_FAILURE.

Remarks

The host name and port can either be read from the environment variables GL_NSHOST and GL_NSPORT, or set using this function. Both mechanisms set the name server globally. The settings remain in effect until changed with this function.

Example Code Shown in Table 10

TABLE 10

```
void Demo_GroupLens_SetNameServer( )
    {
    int rc ;
    char ErrorMsg[256] ;
    GroupLens_CreateThreadContext( ) ;
    rc = GroupLens_SetNameServer("augusta.netperceptions.com",
        9009) ;
    if ( rc != GL_SUCCESS ) {
        printf("Unable to set server. Error msg = '%s'\n",
```

TABLE 10-continued

```
        ErrorMsg) ;
    return ;
    }
/* Register the new user in the 'Restaurants' partition. */
rc = GroupLens_Register("Eater10", "mypass") ;
if ( rc == GL_SUCCESS ) {
    printf("Registration successful.\n") ;
    }
else {
    GroupLens_GetErrorMsg(ErrorMsg, 256) ;
    printf("Unable to register. Error msg = '%s'\n",
        ErrorMsg) ;
    return ;
    }
GroupLens_ChangePassword("Eater10", "mypass", "mynewpass") ;
printf("\n") ;
GroupLens_DeleteThreadContext( ) ;
}
``` hPartition The handle of an open partition.

ItemName The name of the specific item for which a property is being set. Often, this will be a string ID for the item.

PropertyID A numeric property ID.

Value The value to be associated with the property.

Sets a rating property for a specified item in a specified group.

Return Value

GL_SUCCESS if successful in setting the rating, otherwise GL_FAILURE.

Remarks

Unlike with the GroupLens_GetPredictionProperty functions, the integer and float value parameters to these functions are not pointers.

Example Code Shown in Table 11

TABLE 11

```
void Demo_GroupLens_SetRatingProperty( )
{
    float TotalTime ;
    int   glRating ;
    char  Comments[ ] = "This is cool stuff." ;
    GL_HANDLE hPartition ;
    char  ErrorMsg[256] ;
    int   rc ;
    GroupLens_CreateThreadContext( ) ;
    hPartition = GroupLens_OpenPartition("Restaurants", "Eater10",
        "mypass") ;
    if ( hPartition < 0 ) {
        GroupLens_GetErrorMsg(ErrorMsg, 256) ;
        printf("Unable to open partition 'Restaurants' for Eater10.
Error msg = '%s'\n", ErrorMsg) ;
        return ;
        }
    GroupLens_SetRatingPropertyFloat(hPartition, "Cafe10", GL_TIME,
        TotalTime) ;
    glRating = 1 ;
    GroupLens_SetRatingPropertyInt(hPartition, "Cafe10", GL_RATING,
        glRating) ;
    GroupLens_SetRatingPropertyString(hPartition, "Cafe10", GL_TEXT,
        Comments) ;
    /* Note that the address opoerator & is not used for a
 * string. */
    rc = GroupLens_FlushRatings(hPartition) ;
    if ( rc == GL_SUCCESS ) {
        printf("Ratings flushed successfully!\n") ;
        }
    else {
        GroupLens_GetErrorMsg(ErrorMsg, 256) ;
        printf("Error flushing ratings. Error msg = '%s'\n",
            ErrorMsg) ;
        }
    printf("\n") ;
    GroupLens_ClosePartition(hPartition) ;
    GroupLens_DeleteThreadContext( ) ;
}
```

Grouplens_Setratingproperty int GroupLens_SetRatingPropertyInt (GL_HANDLE hPartition, char *ItemName, int PropertyID, int Value);
int GroupLens_SetRatingPropertyFloat (GL_HANDLE hPartition, char *ItemName, int PropertyID, float Value);
int GroupLens_SetRatingPropertyString (GL_HANDLE hPartition, char *ItemName, int PropertyID, char *Value);

Summary of Method Steps

Figure 16:
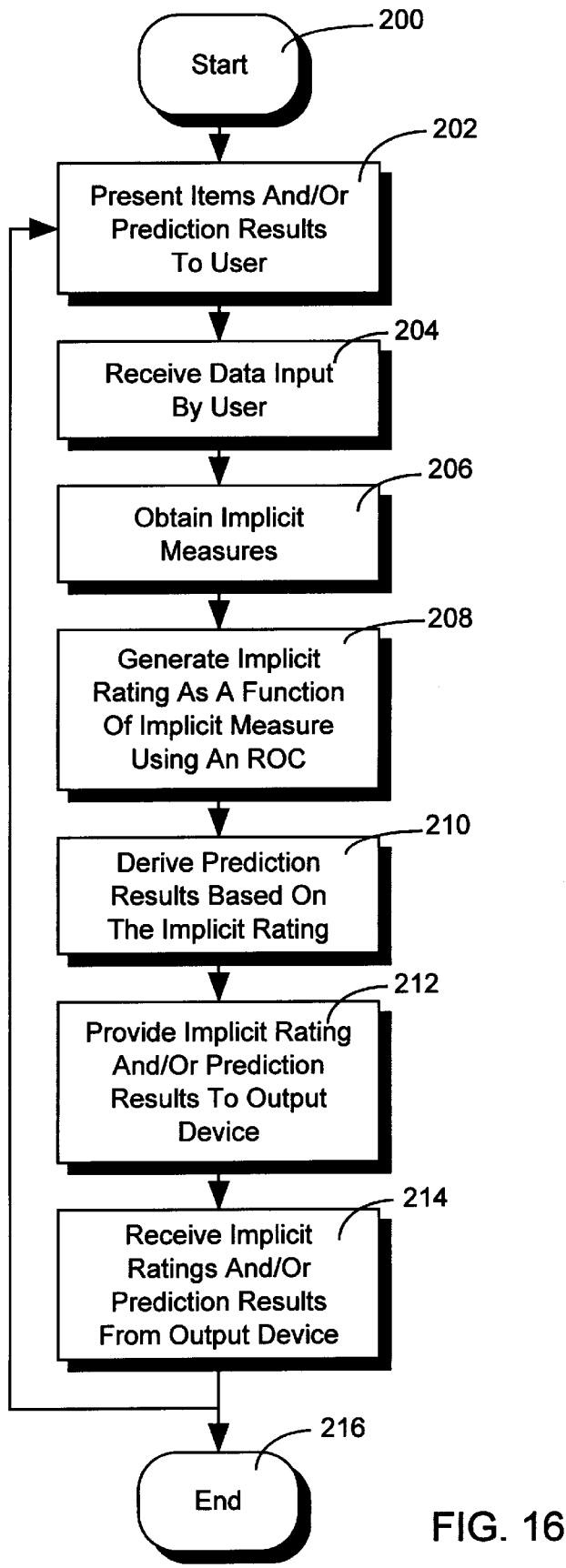
FIG. 16 is a flowchart of steps performed by a preferred embodiment prediction information system as shown in FIG. 1.

The present invention can be summarized in reference to FIG. 16 which is a flowchart of steps 200–216 performed by the electronic rating broker 156 on a computer system 140 in order to provide implicit ratings generated with an ROC.

First, an implicit measure is obtained 206 concerning items presented to a user. An implicit rating is generated 208 as a function of the implicit measure using a receiver operating curve (ROC). This implicit rating is provided 212 to an output device.

In an alternative embodiment several additional steps are performed by the rating broker 156. These steps include deriving prediction results 210 based on the implicit rating. In addition, the prediction results are provided 212 to the output device. In some instances, the prediction results may be derived based on both the implicit rating and at least one rating from another user.

In another alternative embodiment, the rating broker 156 may also perform steps which directly interface with the user through a client device. These possible steps are: receiving 214 the implicit rating and/or the prediction results from the output device of the rating broker 156, receiving 204 data input by the user which is used to determine the implicit measure, as well as presenting 202 the items, implicit rating, and/or the prediction results to the user on a display device.

The implicit measure preferably is derived from one or more criteria. For example, this criteria may be user time spent viewing a particular item, user time spent listening to a particular item, and/or user time spent sampling a particular item. In addition, the implicit measure may be derived based on subsequent actions taken. These subsequent actions taken, for example, could be: a user viewing details of a particular item after viewing only a title, saving a particular item, forwarding a particular item, saving a return address of a particular item, deleting a particular item, replying to a particular item, and/or printing a particular item.

In order to improve the accuracy of the implicit rating, one embodiment of the present invention derives the implicit rating as a function of several implicit measures of either the same type, different types or both. These implicit measures include at least the one originally obtained from the user.

In another embodiment of the present invention, one or more implicit ratings are generated as a function of the originally obtained implicit measure plus one or more additional implicit measures.

In the preferred embodiment the implicit rating is derived from the particular implicit measure using a receiver operating curve (ROC). It will be appreciated by those skilled in the art that other algorithms such as recall/precision-based algorithms could be used to map implicit measures to implicit ratings.

If an ROC is derived, then it preferably is derived from the items originally presented to the user, a signal to noise characterization, and several implicit measures (which includes the particular implicit measure originally obtained from the user). The signal to noise characterization can be derived from a set of explicit ratings previously obtained for the particular application domain. In addition, rating threshold values can be derived for converting several implicit measures to several implicit ratings from the ROC.

In order to verify that the predictions are good, a quality metric receiver operating curve (ROC) may be derived from a mapping between an implicit measure and an implicit rating. The mapping preferably is based on the items, a signal to noise characterization, and some predictions from a prediction engine. This prediction engine may be the ROC algorithm or another prediction algorithm. In some instances, several quality metric ROCs can be derived, each of which corresponds to a different mapping. If this is done, one of the mappings may be selected for subsequent use based on which of the several quality metric ROCs best fits a given set of criteria. In addition, the implicit ratings can be analyzed to determine whether they are better than a set of explicit ratings based on the quality metric ROC.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, as previously noted the user interface device may be a visual display; however, a printer, an audio device, a olfactory device, a tactile device, or any combination of these user interface devices may be used to convey information to the user without departing from the scope and spirit of the present invention as claimed. Similarly, the input device may be a keyboard, a mouse, a trackball, a touch pad, a light pen, a joy stick, a touch screen, or any other mechanism which is capable of obtaining data input by the user without departing from the scope and spirit of the present invention as claimed.

What is claimed is:

1. A collaborative filtering electronic rating broker, comprising:
    (a) input means for obtaining an implicit measure concerning items presented to a user;
    (b) processing means, operatively coupled to the input means, for generating an implicit rating as a function of the implicit measure using a receiver operating curve (ROC); and
    (c) output means, operatively coupled to the processing means, for providing the implicit rating to collaborative filter.

2. The rating broker of claim 1 wherein the processing means comprises collaborative filtering means for deriving recommendations based on the implicit rating and the output means comprises means for providing the recommendations to an output device.

3. The rating broker of claim 2 wherein the collaborative filtering means comprises means for deriving the recommendations based on both the implicit rating and at least one rating from another user.

4. A recommender system comprising the rating broker of claim 2 further comprising a client device operatively coupled to the collaborative filtering rating broker through an interactive network, the client device comprising:
    (a) user interface means for presenting the items and the recommendations to the user;
    (b) user input means for receiving data input by the user;
    (c) client processing means, operatively coupled to the user interface means and user input means, for obtaining the implicit measure, providing the implicit measure to the input means of the collaborative filtering rating broker, receiving the recommendations from the the collaborative filtering rating broker, and presenting the recommendations to the user on the user interface means.

5. The recommender system of claim 4 wherein the collaborative filtering rating broker and the client device are located within a single apparatus.

6. The recommender system of claim 4 wherein the collaborative filtering rating broker and the client device are remotely located from one another in separate apparatuses.

7. The recommender system of claim 4 wherein the client processing means comprises means for obtaining the implicit measure from the user through the user input means based on criteria selected from a group consisting of: user time spent viewing a particular item, user time spent listening to a particular item, and user time spent sampling a particular item.

8. The recommender system of claim 4 wherein the client processing means comprises means for obtaining the implicit measure from a user through the user input means based on subsequent actions taken by the user, the subsequent actions taken being selected from a group consisting of: a user viewing details of a particular item after viewing only a title, saving a particular item, forwarding a particular item, saving a return address of a particular item, deleting a particular item, replying to a particular item, and printing a particular item.

9. The rating broker of claim 1 wherein the input means comprises means for obtaining a plurality of implicit measures including the implicit measure and the processing means comprises means for generating the implicit rating as a function of the plurality of implicit measures.

10. The rating broker of claim 1 wherein the input means comprises means for obtaining a plurality of implicit measures, the plurality of implicit measures including the implicit measure and the processing means comprises means for generating a plurality of implicit ratings as a function of the plurality of implicit measures.

11. The rating broker of claim 1 wherein the processing means comprises means for deriving the ROC from the items, a signal to noise characterization, and a plurality of implicit measures including the implicit measure.

12. The rating broker of claim 11 wherein the processing means comprises means for deriving the signal to noise characterization from a set of explicit ratings.

13. The rating broker of claim 11 wherein the processing means comprises means for deriving rating threshold values for converting a plurality of implicit measures to implicit ratings from the ROC curve, the plurality of implicit measures including the particular implicit measure.

14. The rating broker of claim 1 wherein the processing means comprises means for deriving a quality metric receiver operating curve (ROC) of a mapping between an implicit measure and an implicit rating, the mapping being based on the items, a signal to noise characterization, and recommendations from a recommendation engine.

15. The rating broker of claim 14 wherein the processing means comprises means for deriving a plurality of quality metric ROCs each of which corresponds to a different mapping and for selecting one of the mappings for subsequent use based on the plurality of quality metric ROCs.

16. The rating broker of claim 14 wherein the processing means comprises means for determining if a plurality of implicit ratings including the particular implicit measure are better than a set of explicit ratings based on the quality metric ROC.

17. A method of operating a collaborative filtering electronic rating broker in order to provide an implicit preference rating, comprising steps of:
 (a) obtaining an implicit measure concerning items presented to a user;
 (b) generating an implicit rating as a function of the implicit measure using a receiver operating curve (ROC); and
 (c) providing the implicit rating to a collaborative filter.

18. The method of claim 17 further comprising steps of:
 (d) deriving recommendations based on the implicit rating; and
 (e) providing the recommendations to an output device.

19. The method of claim 17 wherein the deriving step comprises deriving the recommendations based on both the implicit rating and at least one rating from another user.

20. The method of claim 18 further comprising steps of
 (f) receiving the recommendations from the output device;
 (g) receiving data input by the user; and
 (h) presenting items and the recommendations to the user on a display device.

21. The method of claim 17 wherein the obtaining step comprises deriving the implicit measure based on criteria selected from a group consisting of: user time spent viewing a particular item, user time spent listening to a particular item, and user time spent sampling a particular item.

22. The method of claim 17 wherein the obtaining step comprises deriving the implicit measure based on subsequent actions taken, the subsequent actions taken being selected from a group consisting of: a user viewing details of a particular item after viewing only a title, saving a particular item, forwarding a particular item, saving a return address of a particular item, deleting a particular item, replying to a particular item, and printing a particular item.

23. The method of claim 17 wherein the generating step comprises deriving the implicit rating as a function of a plurality of implicit measures including the particular implicit measure.

24. The method of claim 17 wherein the generating step comprises generating a plurality of implicit ratings as a function of a plurality of implicit measures including the particular implicit measure.

25. The method of claim 17 wherein the generating step further comprises deriving the ROC from the items, a signal to noise characterization, and a plurality of implicit measures including the particular implicit measure.

26. The method of claim 25 wherein the generating step further comprises deriving the signal to noise characterization from a set of explicit ratings.

27. The method of claim 25 wherein the generating step further comprises deriving rating threshold values for converting a plurality of implicit measures to implicit ratings from the ROC curve, the plurality of implicit measures including the particular implicit measure.

28. The method of claim 17 further comprising a step of deriving a quality metric receiver operating curve (ROC) of a mapping between an implicit measure and an implicit rating, the mapping being based on the items, a signal to noise characterization, and predictions from a prediction engine.

29. The method of claim 19 wherein the deriving step comprises deriving a plurality of quality metric ROCs each of which corresponds to a different mapping, the method further comprising a step of selecting one of the mappings for subsequent use based on the plurality of quality metric ROCs.

30. The method of claim 19 further comprising a step of determining if a plurality of implicit ratings including the particular implicit measure are better than a set of explicit ratings based on the quality metric ROC.

31. A program storage device readable by a computer system tangibly embodying a program of instructions executable by the computer system to perform a method of operating a collaborative filtering electronic rating broker in order to provide an implicit rating, the method comprising steps of:
 (a) obtaining an implicit measure concerning items presented to a user;

(b) generating an implicit rating as a function of the implicit measure using a receiver operating curve (ROC); and (c) providing the implicit rating to a collaborative filter.

32. The program storage device of claim 31 wherein the method further comprises steps of:

(d) deriving recommendations based on the implicit rating; and (e) providing the recommendations to an output device.

33. The program storage device of claim 32 wherein the method further comprises steps of:

(f) receiving the recommendations from the output device;

(g) receiving data input by the user; and (h) presenting items and the recommendations to the user on a display device.

34. The recommender system of claim 5, wherein the collaborative filtering rating broker and the client device are located within a single processor.

* * * * *